United States Patent [19]
Ohashi et al.

[11] Patent Number: 5,910,817
[45] Date of Patent: Jun. 8, 1999

[54] OBJECT OBSERVING METHOD AND DEVICE

[75] Inventors: Katsumi Ohashi, Otsu; Masatoshi Kimachi, Katano, both of Japan

[73] Assignee: Omron Corporation, Kyoto, Japan

[21] Appl. No.: 08/651,339

[22] Filed: May 17, 1996

[30] Foreign Application Priority Data

May 18, 1995 [JP] Japan .................................. 7-145546

[51] Int. Cl.⁶ .................................................. H04N 7/18
[52] U.S. Cl. .......................... 348/159; 348/160; 348/161; 340/903; 395/125
[58] Field of Search .................................... 348/159, 148, 348/149, 116, 39, 160, 161; 382/104, 154; 340/903; 395/125; H04N 7/18

[56] References Cited

U.S. PATENT DOCUMENTS

| | | | |
|---|---|---|---|
| 5,410,346 | 4/1995 | Saneyoshi et al. | 348/116 |
| 5,495,576 | 2/1996 | Ritchey | 395/125 |
| 5,612,686 | 3/1997 | Takano et al. | 340/903 |
| 5,647,019 | 6/1997 | Iino et al. | 382/154 |
| 5,687,249 | 11/1997 | Kato | 382/104 |
| 5,687,307 | 11/1997 | Akisada et al. | 395/119 |
| 5,694,483 | 12/1997 | Onoguchi | 382/154 |
| 5,734,807 | 3/1998 | Sumi | 395/127 |

FOREIGN PATENT DOCUMENTS

| | | |
|---|---|---|
| 4300651 | 7/1994 | Germany . |
| WO 94/11852 | 5/1994 | WIPO . |

OTHER PUBLICATIONS

Taniguchi et al., "A Method of Motion Analysis Using Spatio–Temporal Image—Directional Temporal Plane Transform", *Systems and Computers in Japan*, vol. 26, No. 7, pp. 88–97 (Jul. 26, 1995).

Chandrashekhar et al., "Temporal Analysis of Stereo Image Sequences of Traffic Scenes", pp. 203–212, published Oct. 1, 1991.

A translated copy of the International Search Report for corresponding International Application No. PCT/JP96/00691.

Japanese language reference to Taniguchi et al., Denshi Joho Tsushin Gakkai Ronbunshi, "A Method of Motion Analysis Using Spatio–Temporal Image—Directional Temporal Plane Transform", vol. J77–D–II, No. 10, pp. 2019–2026 (Oct., 1994).

Patent Abstracts of Japan, publication No. JP6318299, vol. 94, No. 011, Patentee: Sumitomo Electric Ind.Ltd., p. 1, (Nov. 15, 1994).

Proceedings of the Vehicle Navigation and Information Systems Conference, Dearborn, Institute of Electrical and Electronics Engineers, vol. 1, p. 1, (Oct. 20, 1991).

*Primary Examiner*—Tommy P. Chin
*Assistant Examiner*—Tung Vo
*Attorney, Agent, or Firm*—Dickstein Shapiro Morin & Oshinsky, LLP

[57] ABSTRACT

A method and apparatus for observing vehicles on a road or in a parking lot comprises a pair of cameras directed toward a predetermined observation position simultaneously take pictures. A characteristic portion in each of the respective pictures is extracted. The extracted characteristic portions of the respective pictures are corresponded to the pictures, and the corresponded characteristic portion is measured in three-dimensions to extract the three-dimensional coordinates of the characteristic portions. The three-dimensional coordinates of the extracted characteristic portions are projected on a virtual perpendicular plane, and the projected data is compared with pre-determined two dimensional model data to discriminate the object.

15 Claims, 43 Drawing Sheets

FIG. 7
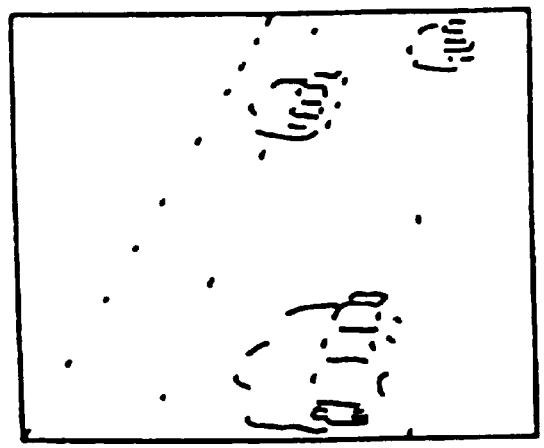
FIG. 8A
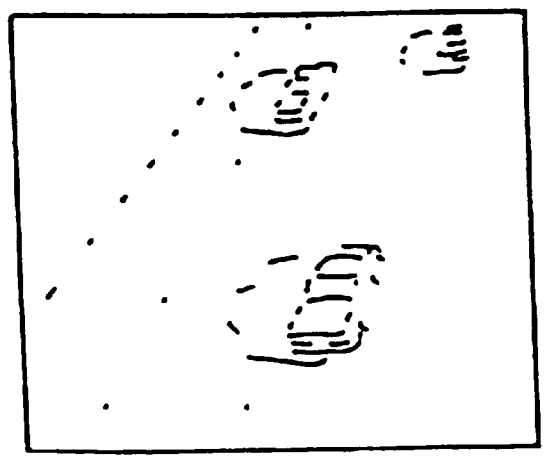
FIG. 8B

FIG. 43A
FIG. 43B
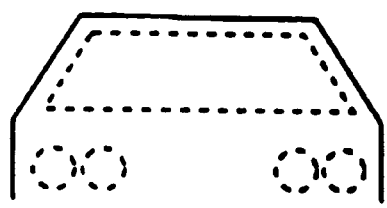
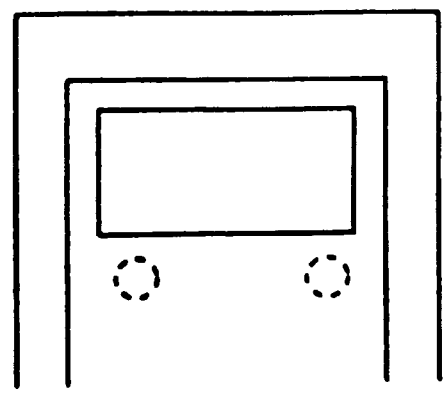

OBJECT OBSERVING METHOD AND DEVICE

BACKGROUND OF THE INVENTION

1. Field of the Invention

This invention relates to a method and device for observing an object at a predetermined observation point, and more particularly to an improved traffic flow measuring device for observing vehicles on a road to measure data such as the number of passing vehicles, the speed of a vehicle and the types of vehicles (called as "traffic flow data" hereinafter) based on the time elapsing results of the measurement and to an improved parking lot observation device for observing vehicles parking in a parking lot.

2. Discussion of the Related Art

For the purpose of measuring traffic flow data, there has been heretofore developed a device in which a camera is installed above a road to take a picture at a predetermined position of the road and a flow of vehicles on the road is measured based on temporal changes of the taken pictures.

In this conventional device, a picture depicting no object on the road is stored as a background picture in advance, a difference between the picture from the camera and the stored background picture is extracted as a picture relating to vehicles, and the results of the extraction are sequentially processed to measure the flow of vehicles on the road (Japanese Electric Society Technical Report, Vol. 512, pp. 80–81).

There also has been proposed a measuring method in which instead of the advance storage of such a background picture, a previously taken picture is stored to subtract the stored previous picture from the latest taken picture to extract only the change of the position of the vehicle.

Quite recently, there has been proposed technique (DTT method) for measuring traffic flow data by making space-time pictures accumulated about pictures taken by a camera for each time (Japanese Electronic Information Communication Society Journal, Vol. J77-D-11 No. 10, pp. 2019–2026, 1994). According to this method, characteristic quantity data such as outline of a vehicle is extracted from the pictures every predetermined time, and the extracted characteristic quantity data is projected on a direction axis in parallel with a movement direction of a vehicle to provide one dimension data. This one dimension data is further arranged in time series to provide a two dimension picture (DDT picture) consisting of a direction axis and a time axis, and the DDT picture extracts an object moving in a predetermined direction.

In order to discriminate whether or not each parking area of a parking lot is vacancy, the above-mentioned first or second method is employed. In other words, the inquiry whether or not a vehicle is parked at a parking area is performed based on the difference between the input picture and the background picture which are obtained by taking a picture at an observation position or the difference between the input picture and its just before taken picture.

When the difference between the input and the background pictures is employed to measure a traffic flow, it is necessary to store background pictures corresponding to various circumstances, such as day and night, fine and rain or the like. In this case, assumption of necessary circumstances or revision of background pictures according to the change of circumstances is limited, and extraction of vehicles with high precision is impossible. The above-mentioned first, second and third methods have the disadvantage that they erroneously detect other movement than vehicles as a vehicle, such as the shadow of a vehicle, the shadow of a tree swaying by a wind, other shadow moving on the road, the reflection from a light in the night, the vehicle reflected in the wet road surface, or the like.

When a large size vehicle exists on a road or traffic congestion happens, the conventional methods have the disadvantages that each vehicle cannot be precisely discriminated, and a plurality of vehicles are erroneously detected as a single vehicle. When a picture of the shadow of a large size vehicle reaches its neighbor lane to overlap a small size vehicle behind the large size vehicle, the small size vehicle is erroneously detected as a large size vehicle. Thus, the number and types of the vehicles on the road cannot be precisely discriminated. These problems are applicable to a conventional observation device at a parking lot, such as decrease of a discriminating accuracy by change of illuminance at an observation point, and erroneous detection of the shadow of a vehicle in neighbor area.

The conventional methods need a storage for storing various background pictures and a picture for each time period, and a hardware for operations such as subtraction and cumulative addition about each picture, so that a whole construction of the conventional device is an a large scale and its manufacturing cost is high.

SUMMARY OF THE INVENTION

It is, therefore, a primary object of this invention to provide an improved system for taking pictures at an observation point by a plurality of cameras, measuring in three-dimensions a characteristic portion in each of the taken pictures, and discriminating an object based on the height data to measure a substance as the objects at a high accuracy.

It is a further object of this invention to provide an improved system for projecting the three-dimensional coordinates about characteristic portions in the picture taken by the respective cameras on a virtual perpendicular plane vertically standing on a plane contacting an object to extract a shape of the object for precisely discriminating the existence the number, and the types of the objects to be measured.

It is a still further object of this invention to provide an improved system for observing a road and a parking space by employing the above-mentioned system to measure a traffic flow or discriminate vehicles based on the observed results.

According to a first aspect of this invention there is provided an object observing method for observing an object including a series of a first step of simultaneously taking pictures by two or more cameras directed toward a predetermined observation position to extract a characteristic portion in each of the respective taken pictures, a second step of corresponding the extracted characteristic portion in the picture to the pictures, a third step of measuring the corresponded characteristic portion in three-dimensions to extract its three-dimensional coordinates, a fourth step of projecting the three-dimensional coordinates of the extracted characteristic portions on a virtual perpendicular plane vertically positioning on a plane contacted by the object, and a fifth step of comparing the projected data with predetermined two-dimensional model data to discriminate the object.

According to a second aspect of this invention, there is provided an object observing method in which the above-mentioned fourth step of projecting is a step of dividing the three-dimensional coordinates of the respective characteristic portions into groups based on a positional relationship on a plane contacted by the object, and of projecting the three-dimensional coordinates included in the groups on the virtual perpendicular plane for each of the groups.

According to a third aspect of this invention, there is provided an object observing method in which the above-mentioned fifth step of comparing is a step of setting a predetermined region including the respective projection points formed on the virtual perpendicular plane by the projecting processing of the above-mentioned fourth step, and of weighting the respective points based on the positional relationship of the respective points in the set region with the projection points to be compared with the two-dimensional model data.

According to a fourth aspect of this invention, there is provided an object observing method for observing an object including a series of a first step similar to that of the first aspect of this invention, a second step of specifying a point showing the representative characteristics about the extracted characteristic portion of each picture, a third step of corresponding the specified representative point to a picture, a fourth step of measuring in three-dimensions for each of the corresponded representative points to extract its three-dimensional coordinates of the respective representative points, a fifth step of projecting the three-dimensional coordinates of the extracted representative points on a virtual perpendicular plane vertically positioning on a plane contacted by the object, and a sixth step of comparing the projected data with predetermined two-dimensional model data to discriminate the object.

According to a fifth aspect of this invention, the above-mentioned projecting process is executed in the same manner as that of the above-mentioned second aspect of this invention.

According to a sixth aspect of this invention, the above-mentioned comparison process is executed in the same manner as that of the above-mentioned third aspect of this invention.

According to a seventh aspect of this invention, there is provided an object observing device for observing an object including two or more cameras directed toward a predetermined observation position, a characteristic extracting means for extracting a characteristic portion in each of the respective pictures simultaneously taken by the cameras, a corresponding means for corresponding the extracted characteristic portions of the respective pictures extracted by the characteristic extracting means to pictures, a coordinate extracting means for three-dimensionally measuring the characteristic portions corresponded by the corresponding means to extract the three-dimensional coordinates of the characteristic portions, a storage means for storing two-dimensional model data of the object, a projecting means for setting a virtual perpendicular plane vertically positioning on a plane contacted by the object to project the three-dimensional coordinates of the characteristic portions extracted by the coordinate extracting means on the virtual perpendicular plane, and a comparing means for comparing the results of projection by the projecting means with the two-dimensional model data stored in the storage means.

According to an eighth aspect of this invention, the above-mentioned projecting means is designed to divide the three-dimensional coordinates of the respective characteristic portions extracted by the coordinate extracting means into groups based on a positional relationship on a plane contacted by the object, and to project the three-dimensional coordinates included in the groups on the virtual perpendicular plane for each of the groups.

According to a ninth aspect of this invention, the above-mentioned comparing means is designed to set a predetermined region including the respective projection points formed on the virtual perpendicular plane by the projecting operation of the projecting means, and to weight the respective points based on the positional relationship of the respective points in the set region with the projection points to be compared with the two-dimensional model data.

According to tenth aspect of this invention, there is provided an object observing device including two or more cameras and a characteristic extracting means which are similar to those of the above-mentioned seventh aspect, a representative point specifying means for specifying points respectively showing representative characteristics about the characteristic portions of the respective pictures extracted by the characteristic extracting means, a corresponding means for corresponding the respective representative points specified by the representative point specifying means to the pictures, a coordinate extracting means for three-dimensionally measuring for each of the representative points corresponded by the corresponding means to extract the three-dimensional coordinates of the respective representative points, a storage means for storing two-dimensional model data of the object, a projecting means for setting a virtual perpendicular plane vertically positioning on a plane contacted by the object to project the three-dimensional coordinates of the representative points extracted by the coordinate extracting means on the virtual perpendicular plane, and a comparing means for comparing the results of projection by the projecting means with the two-dimensional model data stored in the storage means.

According to eleventh aspect of this inventions there is provided a traffic flow measuring device for observing a flow of a vehicle on a road to measure traffic flow data on the road based on time change of the observation results including two or more cameras disposed above the road directed toward an observation position on the road, a characteristic extracting means for extracting a characteristic portion in each of the respective pictures simultaneously taken by the cameras for each predetermined time period, a corresponding means for corresponding the extracted characteristic portions of the respective pictures extracted by the characteristic extracting means to the pictures, a coordinate extracting means for three-dimensionally measuring the characteristic portions corresponded by the corresponding means to extract the three-dimensional coordinates of the characteristic portions, a projecting means for setting a virtual perpendicular plane along the road to project the three-dimensional coordinates of the characteristic portions extracted by the coordinate extracting means on the virtual perpendicular plane, a storage means for storing a shape model of a side face of each vehicle about a plurality types of vehicles, a vehicle discriminating means for comparing the projection results by the projecting means with the respective models stored in the storage means to discriminate vehicles on the road, and an observing means for sequentially tracing the discrimination results by the vehicle discriminating means to observe the flow of the vehicles on the road.

According to twelfth aspect of this invention, there is provided a traffic flow measuring device for observing a flow of a vehicle on a road to measure traffic flow data on the road based on time change of the observation results, which includes cameras, a characteristic extracting means, corresponding means, and coordinate extracting means, which are similar to those of the above eleventh aspect, and further includes a vehicle discriminating means for discriminating vehicles on the road by employing a relative positional relationship of three dimensional coordinates satisfying a predetermined height condition among the three dimensional coordinates of the respective characteristic portions extracted by the coordinate extracting means, and an observing means for sequentially tracing the discrimination results by the vehicle discriminating means to observe the flow of the vehicles on the road.

According to thirteenth aspect of this invention, there is provided a parking lot observing device for observing vehicles parking within a predetermined shape of area including two or more cameras disposed above the area directed toward the area, a characteristic extracting means for extracting a characteristic portion in each of the respective pictures simultaneously taken by the cameras, a corresponding means for corresponding the extracted characteristic portions of the respective pictures extracted by the characteristic extracting means to the pictures, a coordinate extracting means for three-dimensionally measuring the characteristic portions corresponded by the corresponding means to extract the three-dimensional coordinates of the characteristic portions, a projecting means for setting a virtual perpendicular plane vertically standing on a vehicle parking plane of the area to project the three-dimensional coordinates of the characteristic portions extracted by the coordinate extracting means on the virtual perpendicular plane, a storage means for storing a shape model of a side face of each vehicle about a plurality types of vehicles, and a vehicle discriminating means for comparing the projection results by the projecting means with the respective models stored in the storage means to discriminate vehicles on the area.

According to a fourteenth aspect of this invention, there is provided a parking lot observing device for observing vehicles parking within a predetermined shape of area which includes cameras, a characteristic extracting means, a corresponding means, and a coordinate extracting means, which are similar to those of the thirteenth aspect, and further includes a discriminating means for discriminating vehicles within the area by employing three dimensional coordinates satisfying a predetermined height condition among the three dimensional coordinates of the respective characteristic portions extracted by the coordinate extracting means.

According to the first and seventh aspects of this invention, characteristic portions of the respective pictures are extracted from the pictures taken by two or more cameras, the three-dimensional coordinates of the characteristic portions are extracted based on corresponding relations with pictures of these characteristic portions, and the extracted three dimensional coordinates are projected on the virtual perpendicular plane vertically positioning on the plane contacted by the object to extract a shape of the object. The results of projection are compared with the model data of the object to discriminate the object. Thus, the types, positions and the number of the objects at the observation position can be precisely confirmed, and it can be avoided that plane data such as the shadow of an object is erroneously recognized as an object, whereby the observation accuracy is fairly improved.

According to the fourth and the tenth aspects of this invention, when the characteristic portions are extracted from the pictures taken by two or more cameras in the same way as the above-mentioned way, representative characteristic points (for example, a central point of the characteristic portion) are specified about the respective characteristic portions. The three dimensional coordinates are extracted about the specified respective representative points in the same way as the above one, and the discrimination of the object is performed based on the results of projecting the extracted results on the virtual perpendicular plane. Thus, the processing speed is fairly shortened.

According to the second, fifth and eighth aspects of this invention, after the extracted three dimensional coordinates are divided into groups based on the positional relationship on the plane contacted by the object, the projecting process to the above-mentioned virtual perpendicular plane is executed for each of the groups, so that a plurality of objects can be individually discriminated based on the positional relationship.

According to the third, sixth and ninth aspects of this invention, for each of projection points on the virtual perpendicular plane, the respective points within a predetermined area including the projection point are weighted based on the distances with the projection point to be compared with the model data to remove an error developed during three-dimensional measurement. Thus, the discrimination accuracy is improved.

According to the eleventh aspect of this invention, the picture obtained by taking the picture at the observation position by two or more cameras disposed above the road is taken every predetermined time period, and the three dimensional coordinates of characteristic portions in the respective pictures are extracted in the same way as the above one to project the extraction results on the virtual perpendicular plane along the road. Accordingly, the shape of a side face of a body on the road is projected on the virtual perpendicular plane. In the storage means there are stored shape models of side faces of a plurality types of vehicles, and the models are compared to the above-mentioned projection results to discriminate the types, number and positions of vehicles on the road. Thus, the traffic flow can be precisely measured. According to the above-mentioned comparison process, high accurate vehicle extraction is available in case of overlap of vehicles in traffic congestion. Moreover, the comparison process is executed on the two dimensional plane, so that the hardware construction can be miniaturized, the processing speed can be improved, and the high accurate traffic flow measuring device can De provided at a reduced cost.

According to the twelfth aspect of this invention, after characteristic portions are extracted from the pictures obtained by two or more cameras disposed above the road, the respective character portions are weighted in the same manner as above one to be three-dimensionally measured, the vehicles on the road are discriminated by employing a relative relationship of the three dimension coordinates satisfying the predetermined height conditions. Accordingly, for example, by extracting lights of vehicles running at night the discrimination operation can be performed. Even if a picture showing the shape of a vehicle at night is difficult to be extracted, the discrimination of vehicles on the road is possible with a high accurate traffic flow measurement.

According to the thirteenth and fourteenth aspects of this invention, the two or more cameras are disposed in directions to the predetermined shape of area for simultaneously taking pictures, and the three-dimensional coordinates are extracted about the taken pictures in the same way as the above one. After this extraction, according to the fifteenth aspect of this invention, the extracted three-dimensional coordinates are projected on the virtual perpendicular plane vertically positioning on a plane set by a vehicle in the area, and the projection results are compared with the type models of various vehicles, whereby the type of the vehicle parking within the area can be precisely discriminated.

According to the fourteenth of this invention, the existence or absence of a vehicle in the area can be easily discriminated in accordance with the satisfaction or unsatisfactoriness by the extracted three dimensional coordinates about the predetermined height condition.

According to the thirteenth and fourteenth aspects of this invention, the hardware construction is reduced, and the processing speed is improved, whereby problems in the conventional parking lot measurement are solved.

BRIEF DESCRIPTION OF THE DRAWINGS

Other objectives and advantages of this invention will be more readily apparent from the following detailed description provided in conjunction with the following figures, of which:

FIG. 7 shows a Laplacian filter employed in the measuring device;

FIGS. 8A and 8B show one example of extraction of edge pictures;

FIGS. 43A and 43B show shapes of models;

DETAILED DESCRIPTION OF THE INVENTION

There will be disclosed five embodiments of this invention hereinafter, in which a pair of cameras 3a and 3b are disposed to be directed to a road or a parking area for simultaneously taking pictures, characteristic portions such as edge constructive points are extracted from input pictures through the cameras, and the characteristic portions are corresponded to pictures to compute three dimensional coordinates of the characteristic portions. The computed three dimensional coordinates are projected on a virtual perpendicular plane or coordinate points having the predetermined height data are extracted, and by using the results of this process an observing process of an object (vehicle, in these embodiments) is executed.

Figure 1:
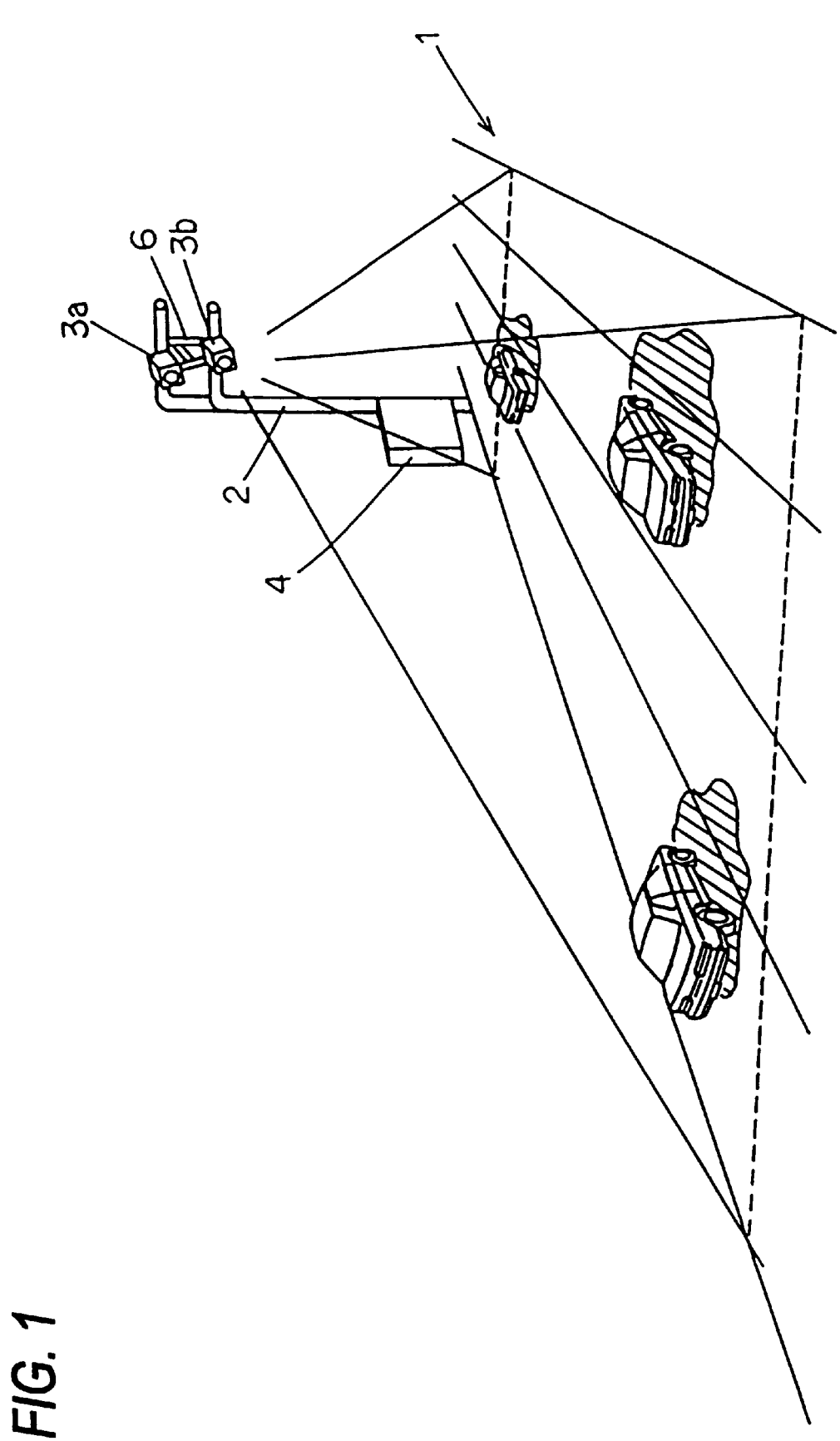
FIG. 1 is a perspective view of a traffic flow measuring device as a first embodiment of this invention.

Referring, now, to FIG. 1 there is shown a perspective view of a traffic flow measuring device as a first embodiment of this invention. The traffic flow measuring device includes the pair of cameras 3a and 3b and a controller 4 which are mounted on an F-shaped prop 2 standing on one side of a road 1. Pictures obtained by the cameras 3a and 3b taking a picture of the road from the above are processed by the controller 4 to discriminate the number and the type of passing vehicles, measure the speed of a specific vehicle, and detect an illegally parking vehicle for each lane of the road 1.

The prop 2 includes a pair of cross rods above the road 1, and the cameras 3a and 3b are mounted on a vertical stick 6 fired across the cross rods. The controller 4 is mounted near a base portion of the prop 2 for the convenience of maintenance and inspection.

Figure 2:
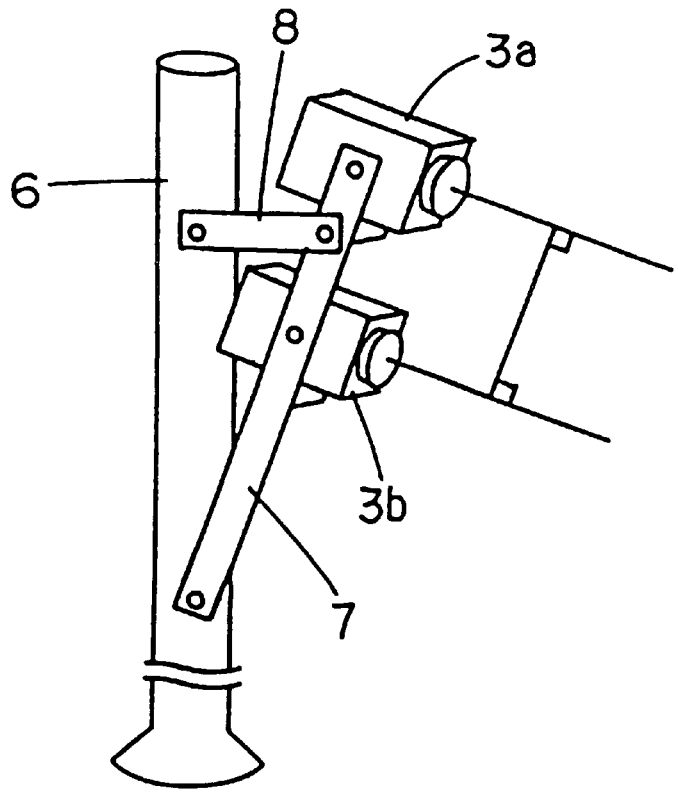
FIG. 2 is a perspective view of an installation of a pair of cameras employed in the device of FIG. 1.

FIG. 2 shows one example of installation of the cameras 3a and 3b. The cameras 3a and 3b respectively have lenses the same focal distance, and at their side walls are supported by a long support plate 7 inclined by a predetermined angle and fixed to the vertical stick 6 through a short reinforcing plate 8. The mounting positions of the cameras 3a and 3b are so adjusted that their optical axes are parallel in a direction orthgonally intersecting a longitudinal direction of the plate 7, viz. a direction toward the road and their taking picture windows are on the same plane. The short reinforcing plate 8 at its one end is connected with the plate 7 at a middle point between the supporting points for the cameras 3a and 3b, and at its another end is fixed to the vertical stick 6 to hold the inclination of the plate 7.

Figure 3:
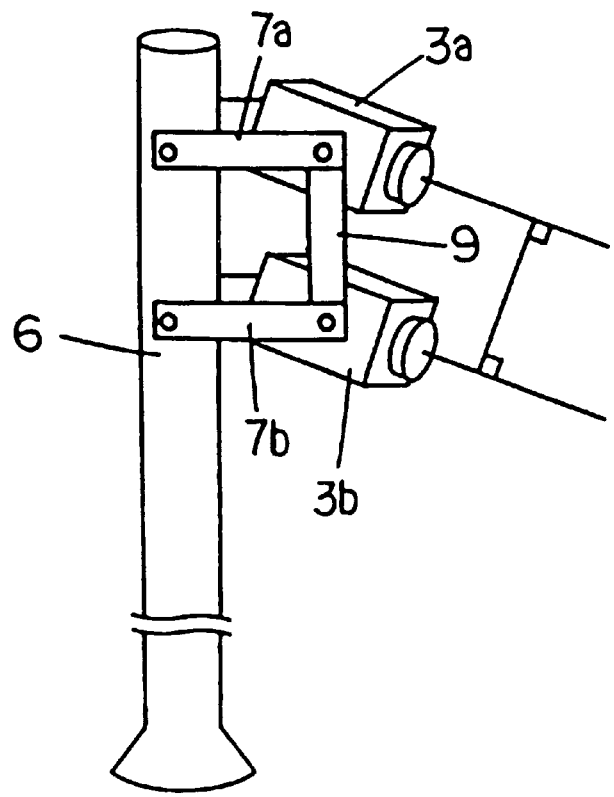
FIG. 3 is a perspective view of another installation of the pair of cameras.

In FIG. 3 there is shown another installation of the cameras 3a and 3b. The cameras 3a and 3b at their both side walls are supported by two pairs of support plates 7a and 7b mounted on and at right angles to the vertical stick 6, and the plates 7a and 7b are kept in a horizonal direction for stabilizing the positions of the cameras 3a and 3b. The positions of the cameras 3a and 3b are so adjusted that their optical axes are in parallel to each other in a direction to the road. In this construction, the taking picture plane of the upper camera 3a is positioned behind the taking picture plane of the lower camera 3b, the picture taken by the camera 3a shall be enlarged according to the backward distance prior to entry to an image processing described later.

Figure 4:
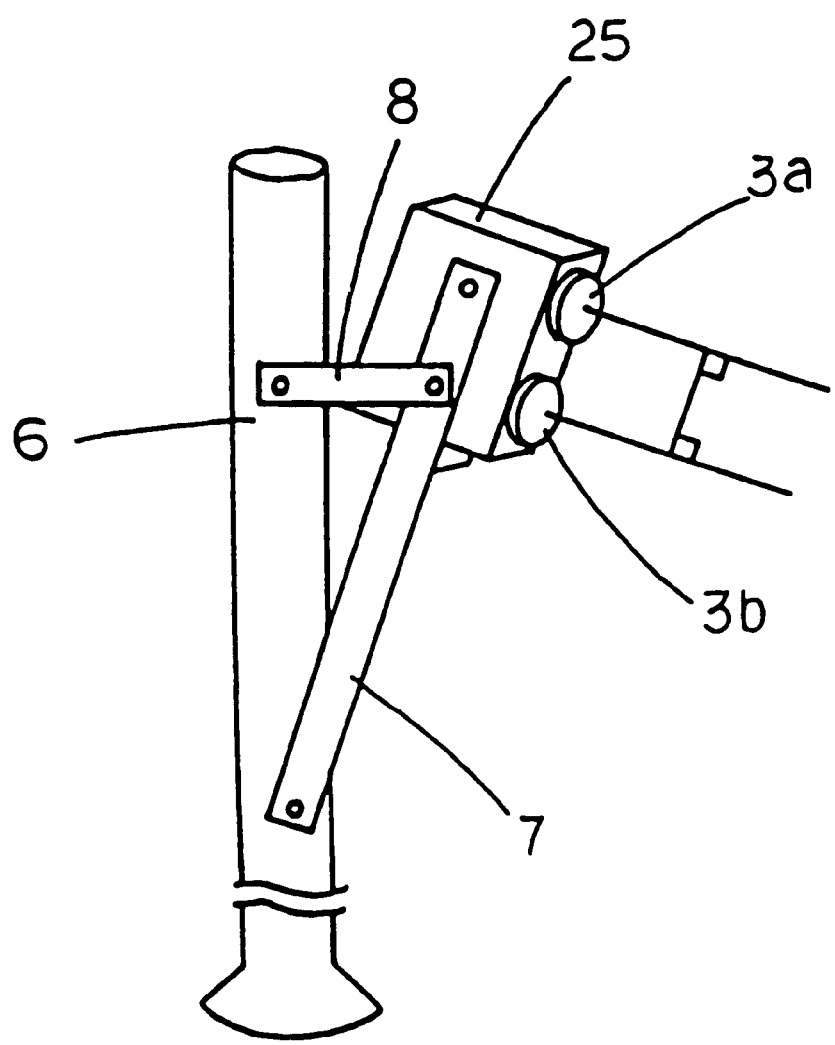
FIG. 4 is a perspective view of united cameras.

The cameras 3a and 3b may be united within a box unit 25 which is supported by support plate 7 and reinforcing plate 8 as shown in FIG. 4.

The road is picked up by two cameras in this embodiment, but, if desired, may be picked up by three or more cameras. The prop mounted by the cameras is not limited to the F-shaped prop 2, but may utilize existing telephone pole or light pole by modification if necessary.

Figure 5:
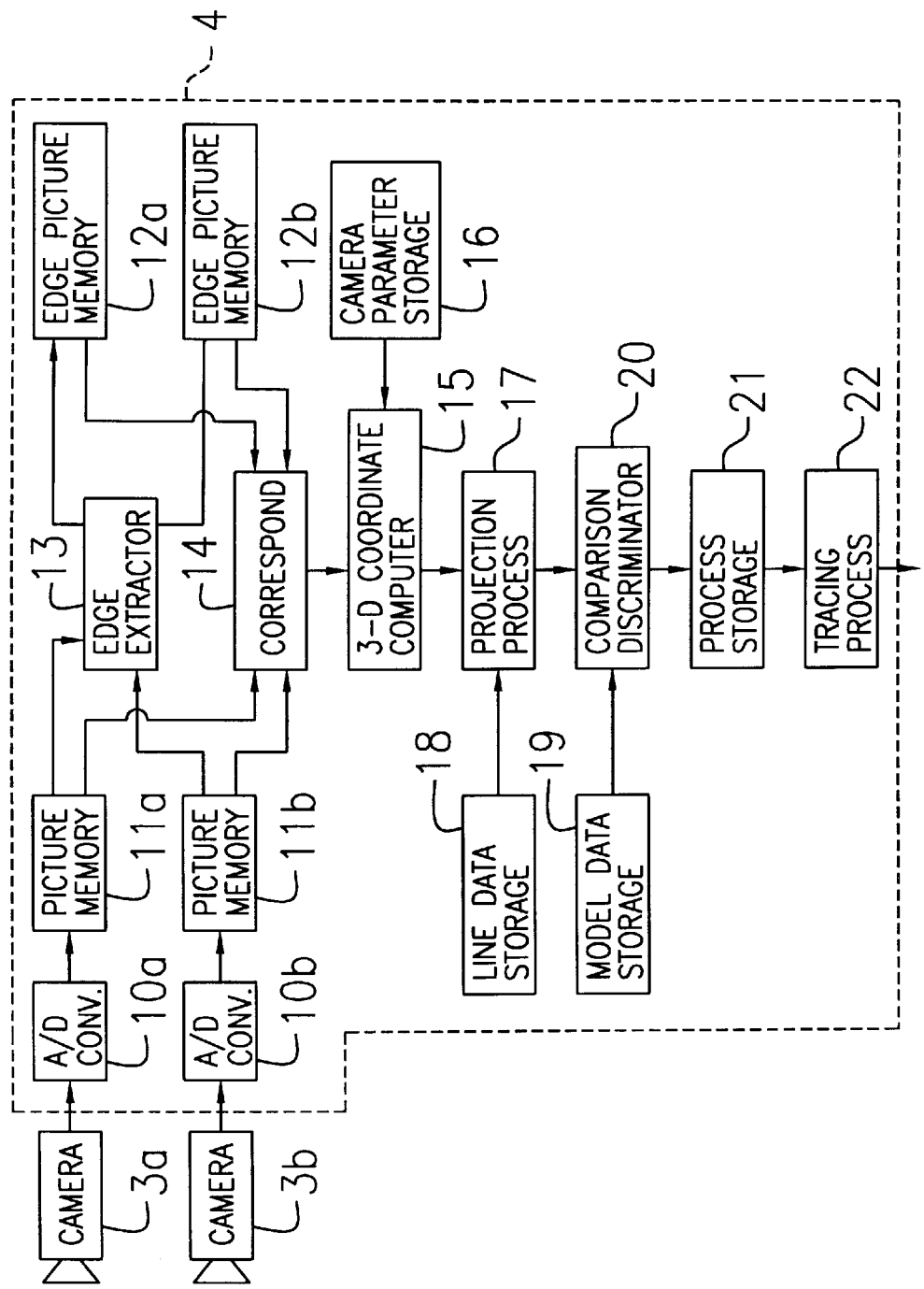
FIG. 5 is an electronic block diagram of the traffic flow measuring device.

In FIG. 5 there is shown an electronic block diagram of the traffic flow measuring device. The controller 4 includes A/D converters 10a and 10b, picture memories 11a and 11b, edge memories 12a and 12b, an edge extracting unit 13, a corresponding unit 14, a three-dimensional coordinate computing unit 15, a camera parameter storage 15, a projection process unit 17, a traffic lane data storage 18, a model data storage 19, a comparison discriminating unit 20, a process result storage 21, and a tracing process unit 22.

The A/D converters 10a and 10b convert analog video signals generated from the cameras 3a and 3b into shading picture signals to be stored into the picture memories 11a and 11b.

A picture of the camera 3a stored in the picture memory 11a is called as "first picture", end a picture of the camera 3b stored in the picture memory 11b is called as "second picture", hereinafter.

Figure 6A:
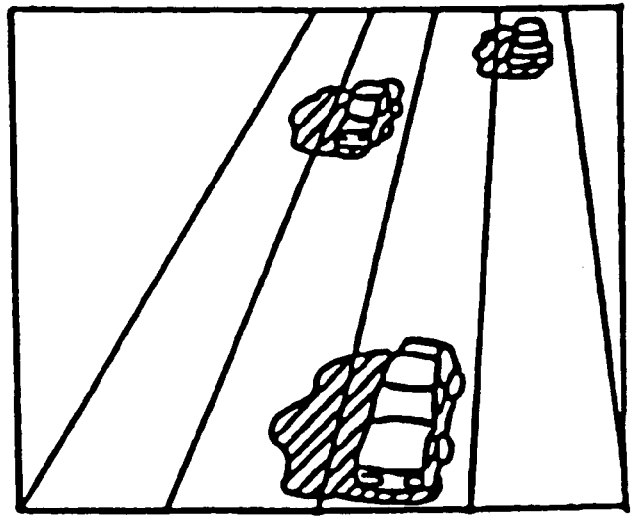
FIGS. 6A and 6B show one example of pictures taken by the respective cameras.
Figure 6B:
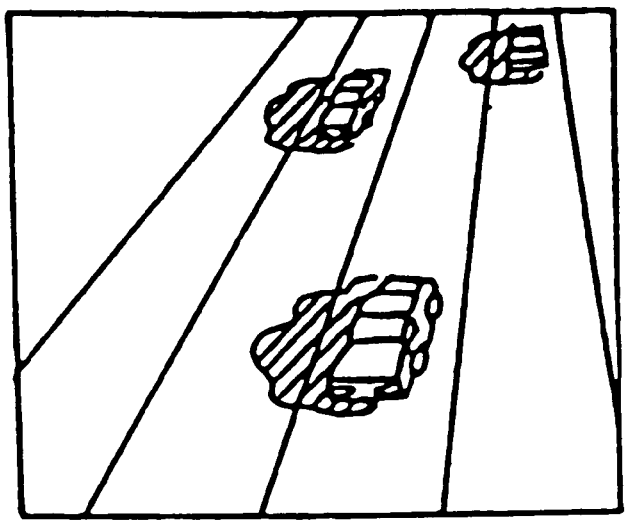

FIGS. 6A and 6B show one example of the first and second pictures in which picture data including traffic lanes, vehicles, and the shadows of vehicles on the road are produced.

The edge extracting unit 13 extracts the first and second pictures from the picture memories 11a and 11b to generate edge pictures. In the unit 13, each picture is scanned by a Laplacian filter shown in FIG. 7 to extract zero-crossing points, and the coordinates of the zero-crossing points are computed to generate a binary edge picture in which the pixels of the computed coordinates are black pixels and other pixels are white pixels. The edge extracting process is not limited to the use of the Laplacian filter, but may employ other edge extracting filter such as a Sobel filter.

An edge picture generated about the first picture (hereinafter called as "first edge picture") is stored in the first edge picture memory 12a, and an edge picture generated about the second picture (hereinafter called as "second edge picture") is stored in the second edge picture memory 12b.

FIGS. 8A and 8B show results of the above-mentioned edge extracting process about the first and second pictures shown in FIGS. 6A and 6B, in which edge components corresponding to outlines of the respective vehicles and their shadows are extracted.

Upon the generation of the edge pictures and the storage into the edge picture memories 12a and 12b, a corresponding, operation for corresponding edge constructive points within the respective edge pictures is executed by the corresponding unit 14, and the three-dimensional coordinates about the respective edge constructive points corresponded by the three-dimensional coordinate computing unit 15 are computed.

Figure 9A:
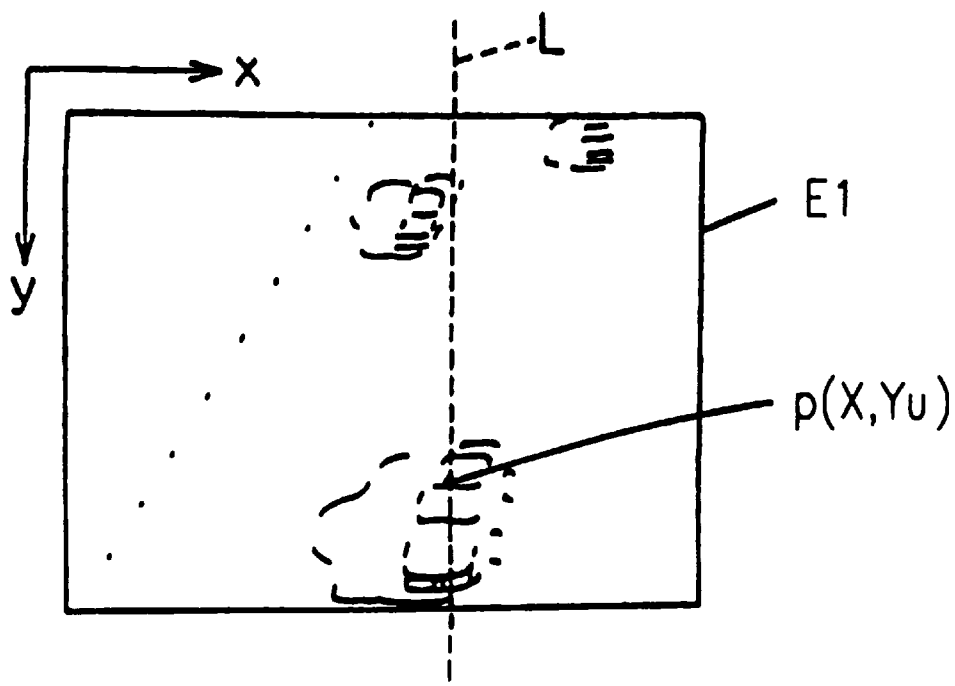
FIGS. 9A, 9B, 9C, and 9D show one example of a corresponding process method.
Figure 9B:
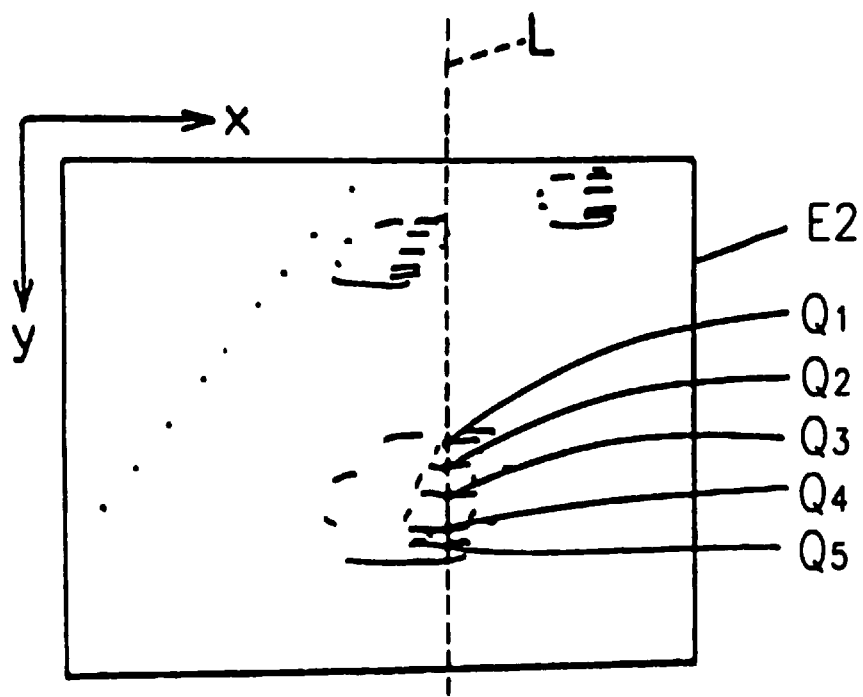

FIGS. 9A, 9B, 9C, and 9D show a concrete example of the corresponding process in the corresponding unit 14. First, the unit 14 extracts a predetermined edge constructive point p from the first edge picture E1 in the edge picture memory 12a as shown in FIG. 9A. Next, the unit 14 aims at the second edge picture E2 in the edge picture memory 12b as shown in FIG. 9B to extract edge constructive points $q_1$, $q_2$, $q_3$, $q_4$, and $q_5$ located on an epipolar line L of the edge constructive point p as the corresponding candidate points of the edge constructive point p in the edge picture E2. The cameras 3a and 3b are disposed tandem, and the epipolar line L is perpendicular to a y-axis, whereby the corresponding candidate points are easily extracted.

Figure 9C:
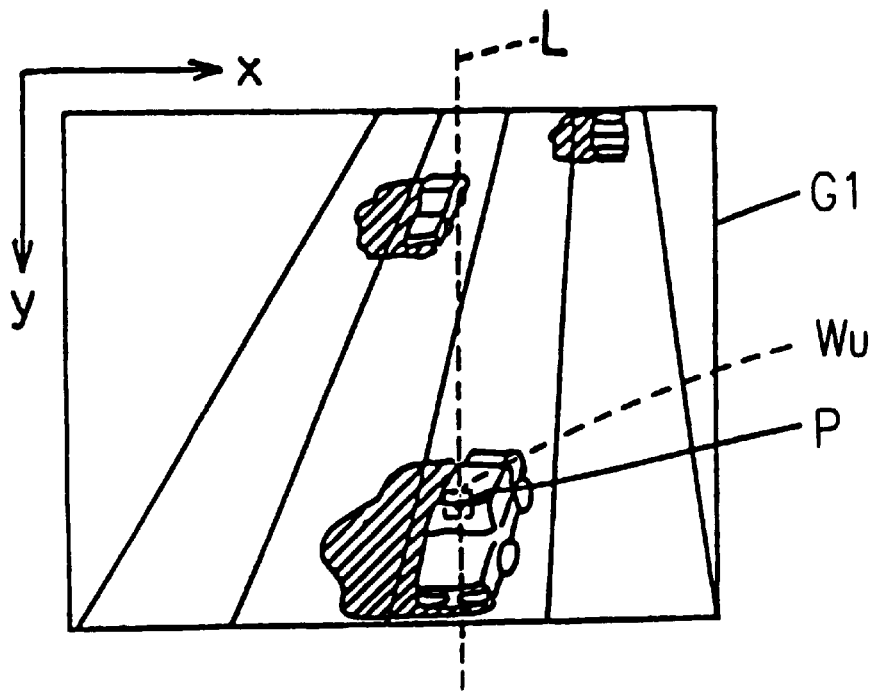
Figure 9D:
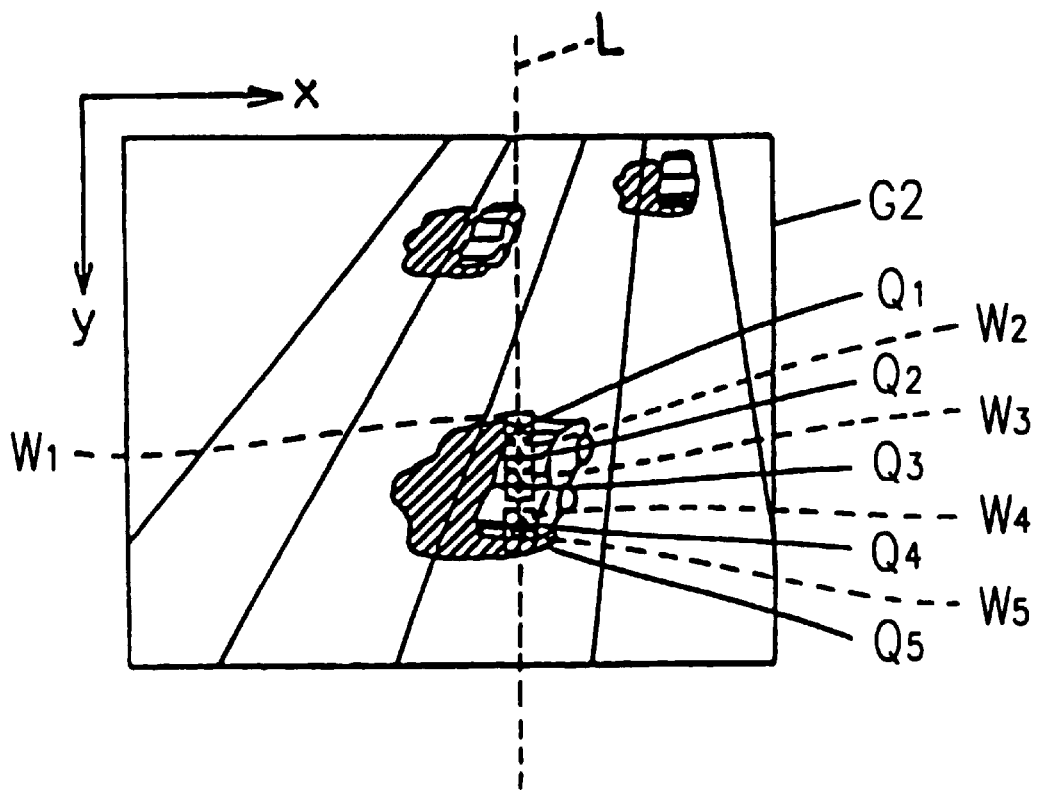

The corresponding unit 14 sets a predetermined size of window $W_u$ centered at a point P positioning at the same coordinates (x, $y_u$) as that of the edge constructive point p on the first picture G1 in the first picture memory 11a as shown in FIG. 9C. The unit 14 also extracts points $Q_q$–$Q_5$ located on the same coordinates (x, $y_1$) (x, $y_2$), (x, $y_3$), (x, $y_4$), and (x, $y_5$) as those of the corresponding candidate points $q_1$–$q_5$ on the second picture G2 in the second picture memory 11b as shown in FIG. 9D, and sets on the second picture G2 the same size of windows $W_1$–$W_5$ respectively centered at the points $Q_1$–$Q_5$ as the size of the window $W_u$.

Upon setting the respective windows, the corresponding unit 14 respectively executes the following equation (1) about the windows $W_1$–$W_5$ on the second picture to compute difference degrees C between the respective windows and the window $W_u$ on the first picture:

$$C = \sum_j \sum_i \{g_U(x+i, y_U+j) - g_L(x+i, y_L+j)\}^2 \quad (1)$$

in which $g_U(x, y)$ represents a luminance value of a predetermined pixel within the window $W_u$, $g_L(x, y)$ represents a luminance value of a predetermined pixel within the window $W_L$(L=1–5)) and i and j represent variables varying according to the size of the respective windows.

The corresponding unit 14 compares the difference degrees C between the respective windows $W_1$–$W_5$, and the window $W_U$, and the window having the smallest different degree is discriminated as the window corresponding to the window $W_U$. A point $q_L$ on the se coordinates $(x, y_L)$ in the second edge picture as that of the central point $Q_L$ of the corresponding window is discriminated as a corresponding point of the edge constructive point p of the first edge picture.

Figure 10:
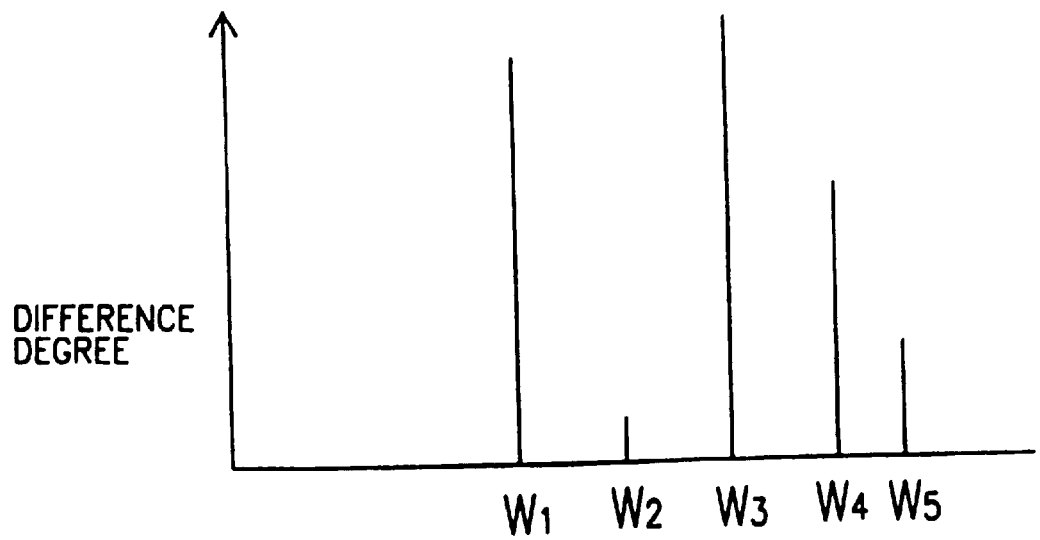
FIG. 10 shows a result of a difference degree operation for the corresponding process.

FIG. 10 shows a result of computation about difference degrees of the respective windows $W_1$–$W_2$ with the window $W_U$. In this graph the difference degree of the second window $W_2$ is the smallest, so that $q_2$ is regarded as the corresponding point in the second edge picture corresponding to the edge constructive point p. Instead of the above-mentioned difference degrees, normalized cross correlation operation with the window $W_U$ may be so executed for each of the respective windows $W_1$–$W_5$ that the window providing the largest correlation value can be regarded as the window corresponding to the window $W_U$.

Upon completing the above-mentioned corresponding process about all edge constructive points within both edge pictures, the three-dimensional coordinate computing unit 15 receives the coordinates $(x, y_U)$ and $(x, y_L)$ of the edge constructive points p and q corresponding to the respective edge pictures E1 and 22 and the parameters of the cameras 3a and 3b stored in the camera parameter storage 16 to compute three-dimensional coordinates corresponding to the respective edge constructive points based on the principle of the trigonometrical measurement.

Figure 11:
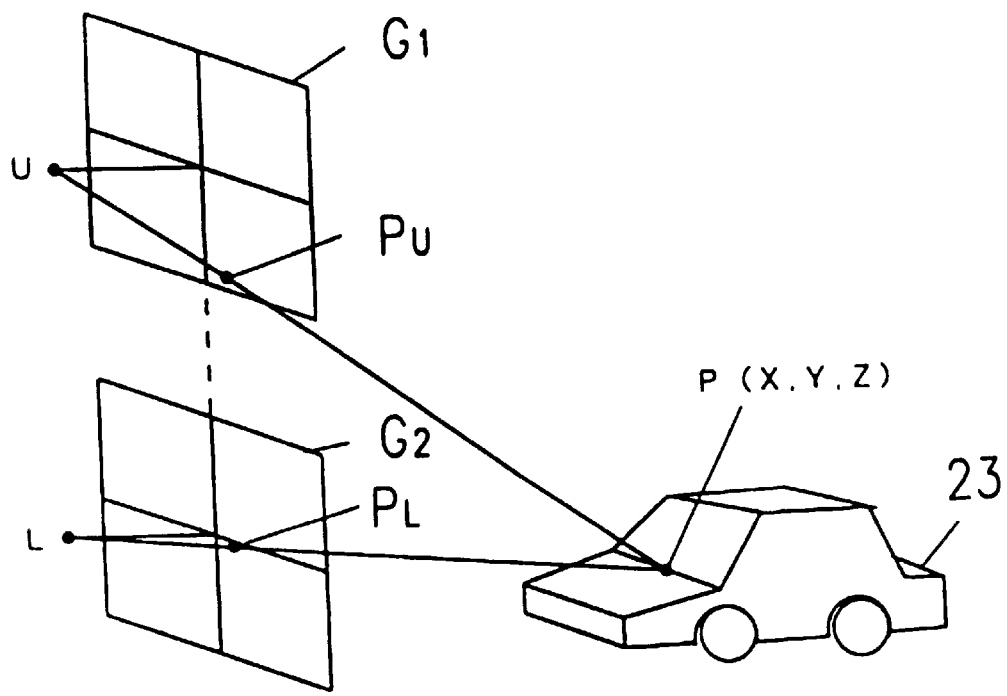
FIG. 11 shows a principle of a trigonometrical measurement.

FIG. 11 shows the principle of the trigonometrical measurement. A point P shows a predetermined characteristic point on an object 23 (vehicle in this embodiment) on a road. Object point images $P_U$ and $P_L$ of the characteristic point P appear on the first picture G1 and the second picture G2, in which U represents the focal point of the camera 3a and L represents the focal point of the camera 3b.

The three dimensional coordinates (X, Y, Z) corresponding to the object point images $P_U$ and $P_L$ correspond to the spatial position of the characteristic point P. The execution of the above-mentioned method about all characteristic points of the object 23 provides measurement of a three-dimensional shape of the object 23.

Based on this principle, the three-dimensional coordinate computing unit 15 executes the following equations (2)–(4) to compute the three-dimensional coordinates corresponding to the respective edge constructive points:

$$X = \frac{x}{F}(H\sin\theta + z\cos\theta) \tag{2}$$

$$Y = H - \frac{y_L}{y_U - y_L}B\cos\theta \tag{3}$$

$$Z = \frac{BF}{(y_U - y_L)\cos\theta} - \frac{y_L}{y_U - y_L}B\sin\theta \tag{4}$$

in which B represents a base line length of each camera, F represents a focal distance of each camera, H represents height data of the second camera 3b, and θ represents an angle of depression of each camera.

Upon computation of the three-dimensional coordinates corresponding to all edge constructive points, the projection process unit 17 sets a virtual perpendicular plane along a longitudinal direction of the road to project the three-dimensional coordinates computed by the three-dimensional coordinate computing unit 15 on the virtual perpendicular plane.

Figure 12:
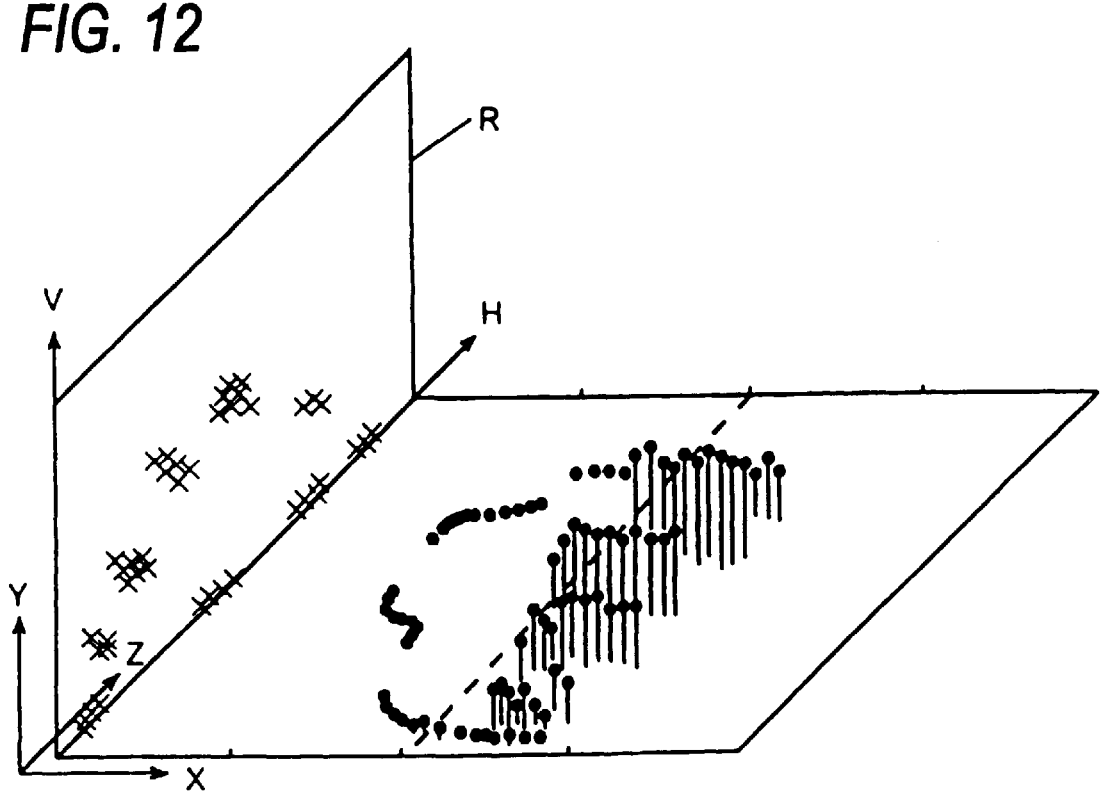
FIG. 12 illustrates a projecting method about three dimensional coordinates

FIG. 12 shows one example of a projecting method, in which X, Y and Z are spatial coordinate axes. The virtual perpendicular plane (shown by a reference mark "R") is defined in a position along the road by a horizontal axis H in parallel with a Z-axis and a vertical axis V in parallel with a Y-axis. When the virtual perpendicular plane R is viewed from the front, the respective edge components viewed from the side of the road are extracted.

The traffic lane data storage 18 stores data representing a positional relationship with each traffic lane on the road viewed from the observation position (viz., x-coordinate and z-coordinate) and the three dimensional coordinates can be projected for each lane by projecting by referring to the stored data. Instead of the traffic lane data storage 18 there may be employed a later described classification processing unit 32 between the three-dimensional coordinate computing unit 15 and the projection process unit 17 to divide the respective three dimensional coordinates into groups based on the positional relation in a width direction of the road and project for each group.

Figure 14A:
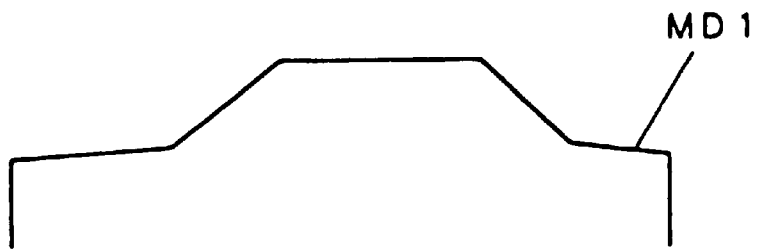
FIGS. 14A, 14B, and 14C show lateral shape models.
Figure 14B:
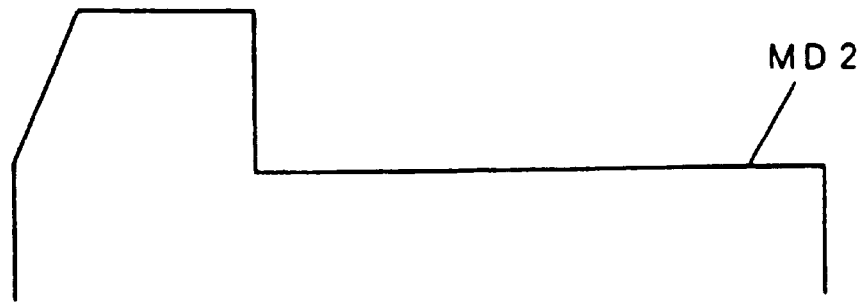
Figure 14C:
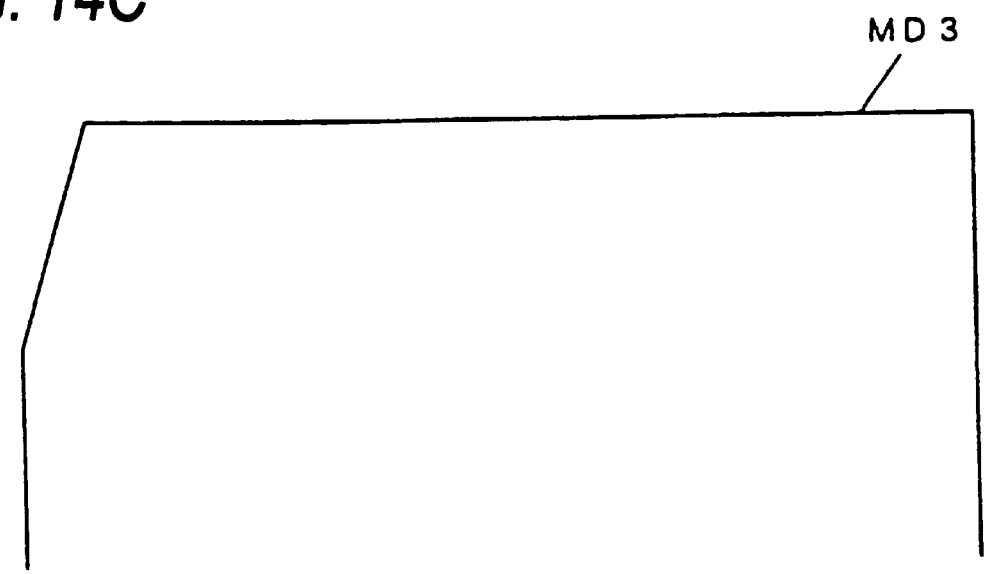

The model data storage 19 stores two-dimensional data MD1, MD2, MD3 ... a respectively representing models of side views about a plural kinds of vehicles, such as a sedan, a truck, a bus and so forth, as shown in FIGS. 14A, 14B and 14C. The comparison discriminating unit 20 sequentially scans these side view models (called simply as "model", hereinafter) about the virtual perpendicular plane R to discriminate a subject represented by the projection points appearing on the virtual perpendicular plane R.

Figure 15A:
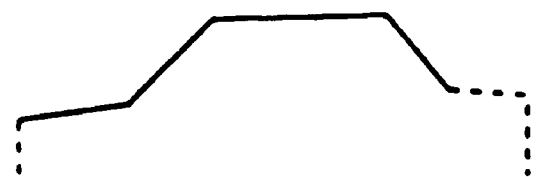
FIGS. 15A, 15B and 15C show other shape models.
Figure 15B:
Figure 15C:

The models of the respective vehicles are not necessary to be limited to the whole side views but may be two-dimensional data respectively representing partial side views (portions represented by solid lines) of the models as shown in FIGS. 15A, 15B, and 15C.

Figure 13:
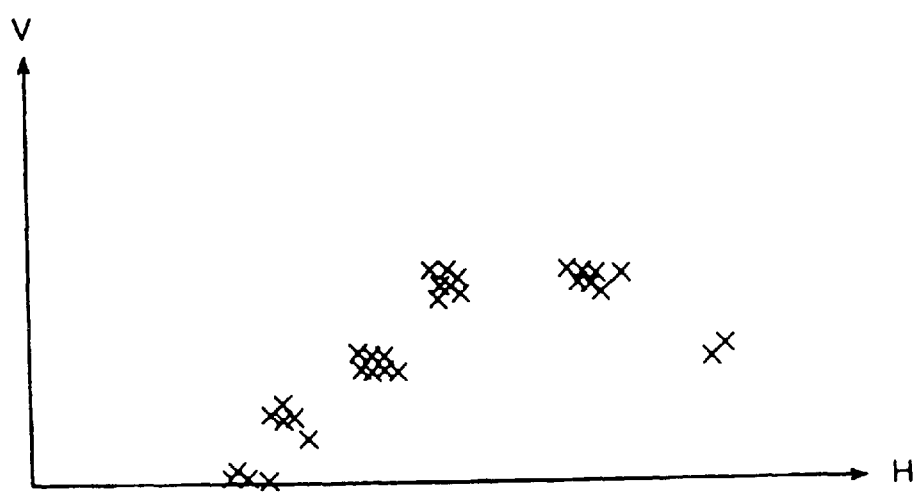
FIG. 13 shows a result of projection to a virtual perpendicular plane.
Figure 16A:
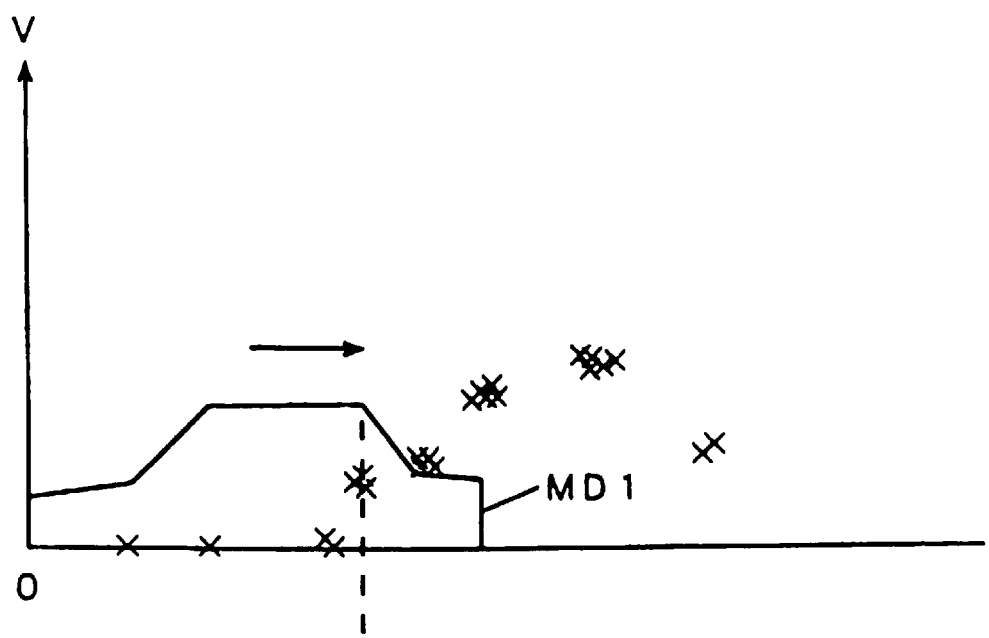
FIG. 16 shows a result of a comparison discrimination process.
Figure 16B:
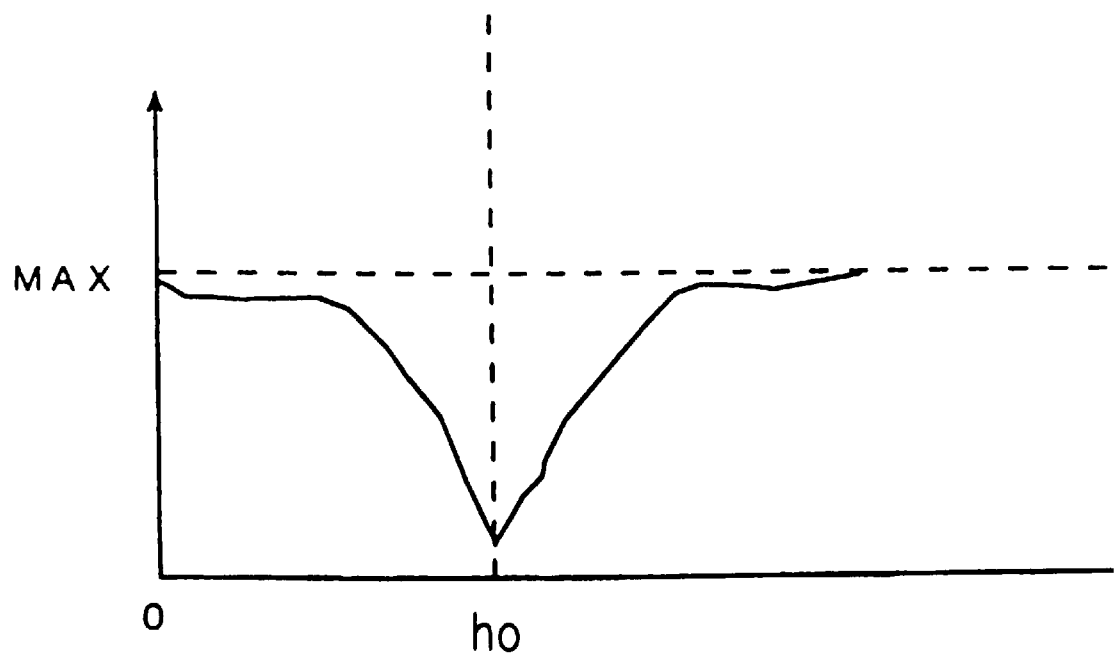

FIG. 16 shows one example of a result of a comparison processing in reference to the model MD1 of FIG. 14A about the projection result shown in FIG. 13.

The comparison discriminating unit 20 regards an original point O of the virtual perpendicular plane R as an initial position, sequentially scans the model MD1 the N-axial direction, and counts the number n of projection points included in the model MD1 in the respective scanning positions. When the number n of the projection points is equal to or larger than a predetermined threshold value TH, the unit 20 execute the following equation (5) to compute an evaluation value Eh of a protected portion overlapped with the model MD1:

$$Eh_i = \sum_{h_k \in S_i} \frac{|V(h_k - h_i) - V_k|}{n} \tag{5}$$

in which $h_k$ and $V_k$ represent coordinates of a point on the virtual perpendicular plane R, $h_i$ represents an H coordinate of a left end point of the model, LN represents a length of the model in the H-axial direction, and V(h) represents a function expressing a height of the model in the coordinates h (0<h<LN). $S_i$ is represented by the following equation (6):

$$S_i = \{h_i | 0 < h_j - h_i < BN\} \tag{6}$$

When the number n of the projection points overlapped with the model is less than the threshold value TH, the comparison discriminating unit 20 sets the maximum value MAX in the evaluation value in the scanning position. The unit 20 scans the virtual perpendicular plane R with all models to compute evaluation values at the respective scanning positions, discriminates the vehicle type of the model providing the minimum evaluation value among the computed evaluation values as the type of the vehicle of the projected portion, and determines the coordinates $h_o$ (shown in FIG. 16) at the time point when the minimum evaluation value is obtained as the beginning position of the vehicle.

Figure 17:
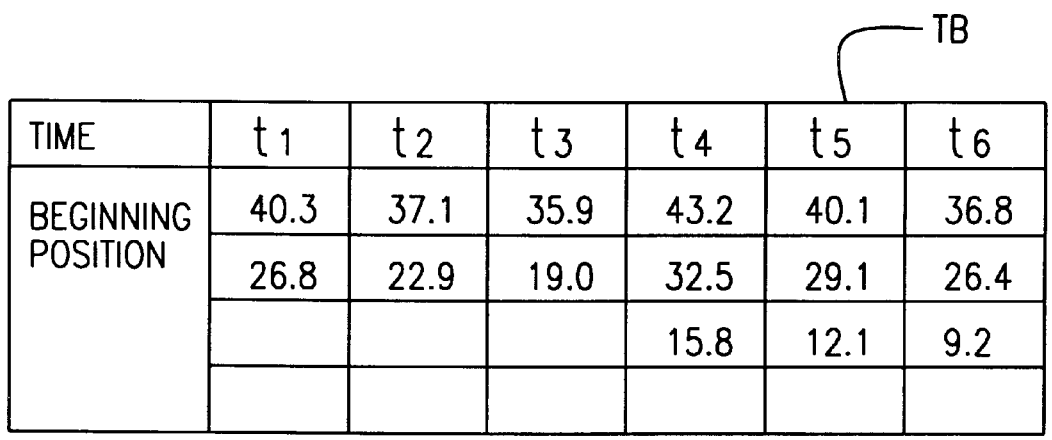
FIG. 17 shows a data construction in a process result storage.

The results of this discrimination is stored in the process result storage 21. Subsequently, the similar operation is executed every predetermined time period, and the process results are sequentially accumulated in the process result unit 21. The unit 21 is provided with a table TB (called as "process result storage table TB", hereinafter) for storing the beginning positions (the coordinates $h_o$ of FIG. 16) of the vehicles extracted for the respective traffic lanes, and the values representing the beginning positions of the extracted vehicles are sequentially stored in the unit 21 every processing time $t_1, t_2, t_3, \ldots$, as shown in FIG. 17.

The tracing process unit 22 reads out the positions of the vehicle detected every processing time from the process result storage table TB, and discriminates temporal change of the positions of the vehicle by respectively corresponding the read out positions to the detected values at the just one step before processing time.

Assuming that the number J of vehicles are detected at a processing time $t_i$ and the beginning position of the "j"th ($1 \leq j \leq j$) detected vehicle is $h_j(t_i)$, the tracing process unit 22 extracts the detection result representing the minimum distance with $h_j(t_i)$ in the positions having differences from the position $h_j(t_i)$ less than a predetermined threshold value in the detection results at the subsequent processing tire $t_{j+1}$, and the extracted position is discriminated as the beginning position $h_j(t_{i+1})$ of the "j"th vehicle at the processing time $t_{i+1}$.

Figure 18A:
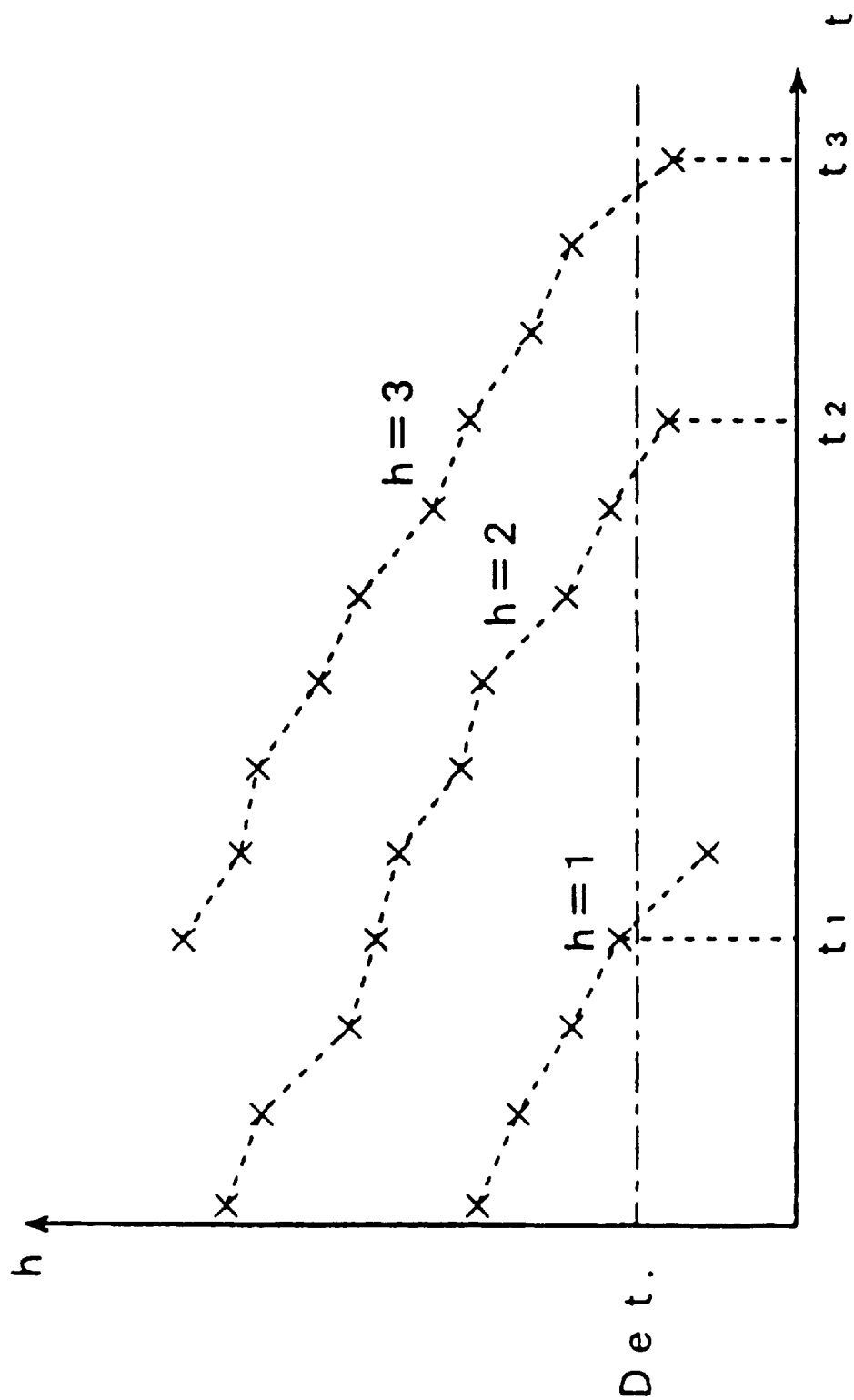
FIGS. 18A and 18B show graphs representing correspondence of detected values of vehicle positions at the respective processing time points.
Figure 18B:
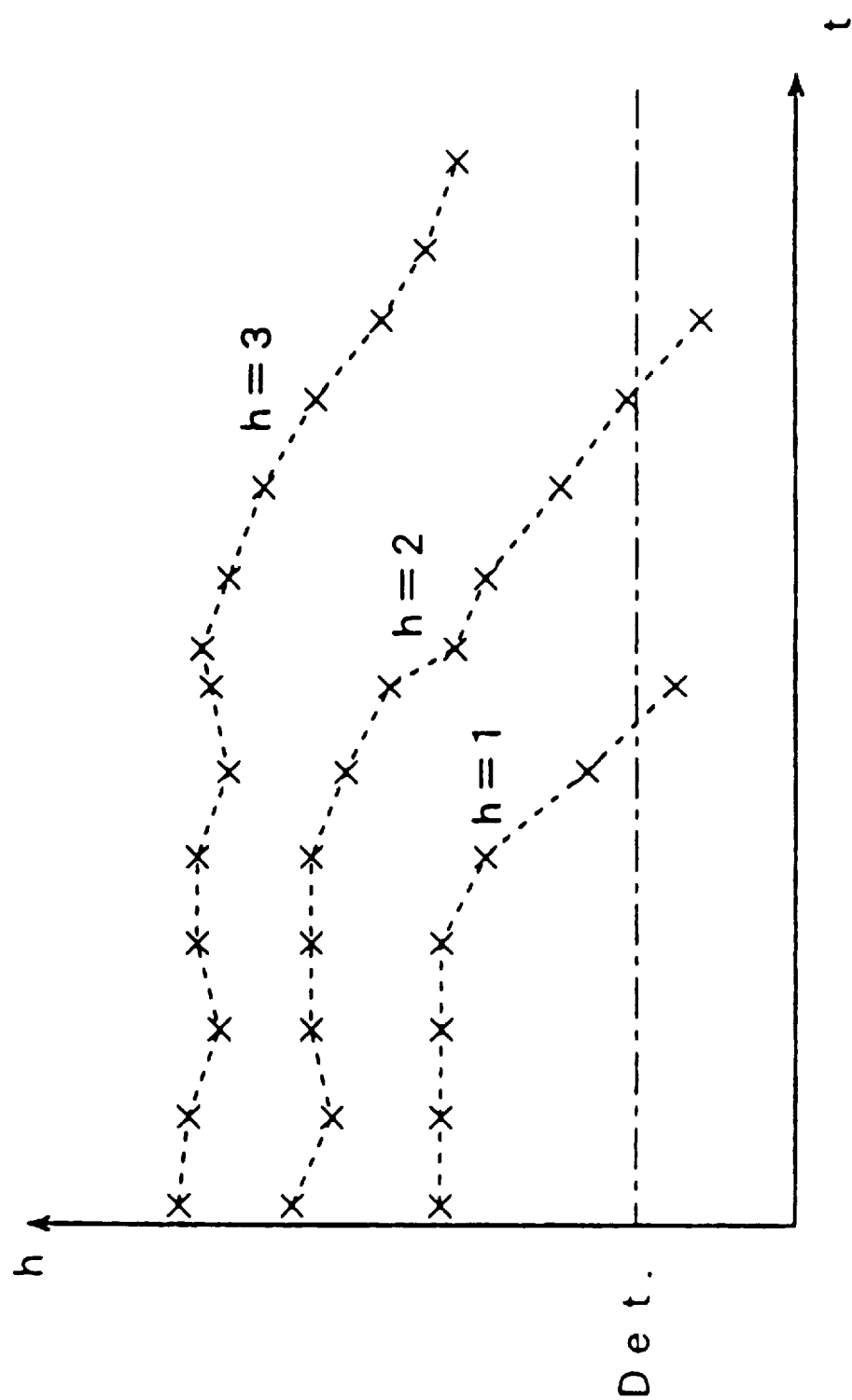

This corresponding process finishes when the data satisfying the above-described conditions exceeds a predetermined detection line Det. (shown in FIGS. 18A and 18B. When there is no data satisfying the conditions at the processing time $t_{i+1}$, the tracing process unit 22 stops the corresponding process. FIGS. 18A and 18B show changes of positions of the respective vehicles discriminated by the corresponding process. The marks "x" represent plots of detection results every processing time, the loci shown in dotted lines represent the corresponded detection results, viz., the positional changes of the respective vehicles.

The detection line Det. corresponds to a predetermined horizontal line on the road, and the tracing process unit 21 executes a count process about passing vehicles at the time points ($t_1, t_2$, and t3 in FIG. 18 when the respective loci cross the detection line Det., and samples the detection values just after the passing and just before several-times detection results to compute the passing speed of the vehicle based on the detection results.

Assuming that N-pieces of detection values are sampled about the u-th locus (u=1, 2, 3 . . . ) and the coordinates of the n-th ($1 \leq n \leq N$) sampled detection value are ($tu_n$; $hu_n$), the passing speed $v_u$ of the vehicle represented by the locus is depressed by the following equation:

$$Vu = \frac{\sum_n hu_n \cdot tu_n - \frac{1}{N}\sum_n hu_n \sum_n tu_n}{\sum_n tu_n^2 - \frac{1}{N}\left(\sum_n tu_n\right)^2} \quad (7)$$

When the respective vehicles moves smoothly, the loci shown in FIG. 18A are obtained. When signal waiting or traffic congestion happens, the detection values at the respective processing times little change as shown in FIG. 18B. According to this method, flat data like shadows of vehicles are not erroneously detected as a vehicle, and vehicles are precisely discriminated to provide a high accurate measurement. In addition to the detection of speed of moving vehicles, the vehicle or substance stopping on the road can be detected, whereby traffic congestion, illegal parking and obstacles can be precisely detected.

Figure 19A:
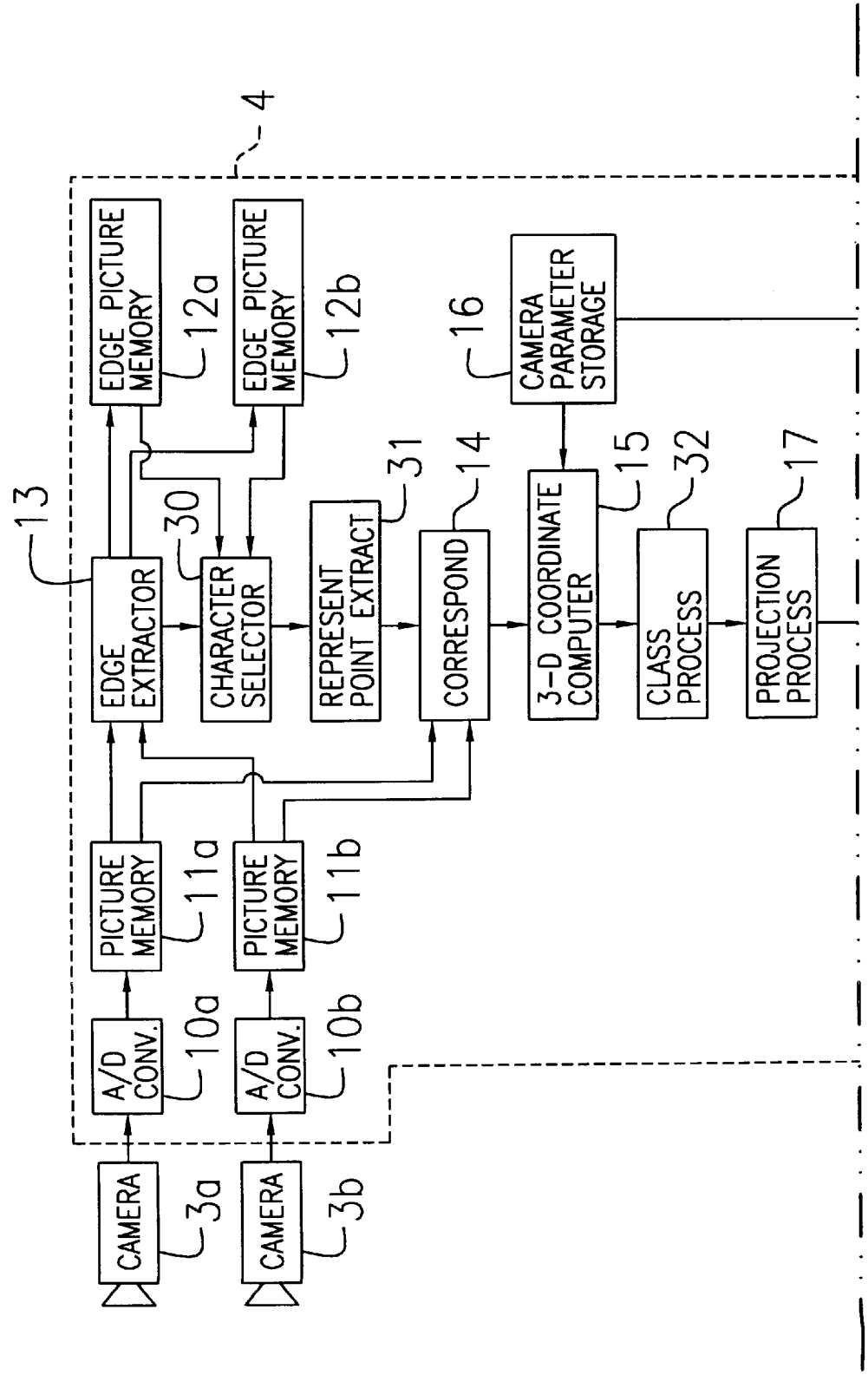
FIGS. 19A and 19B show an electronic block diagram of a traffic flow measuring device as a second embodiment of this invention.
Figure 19B:
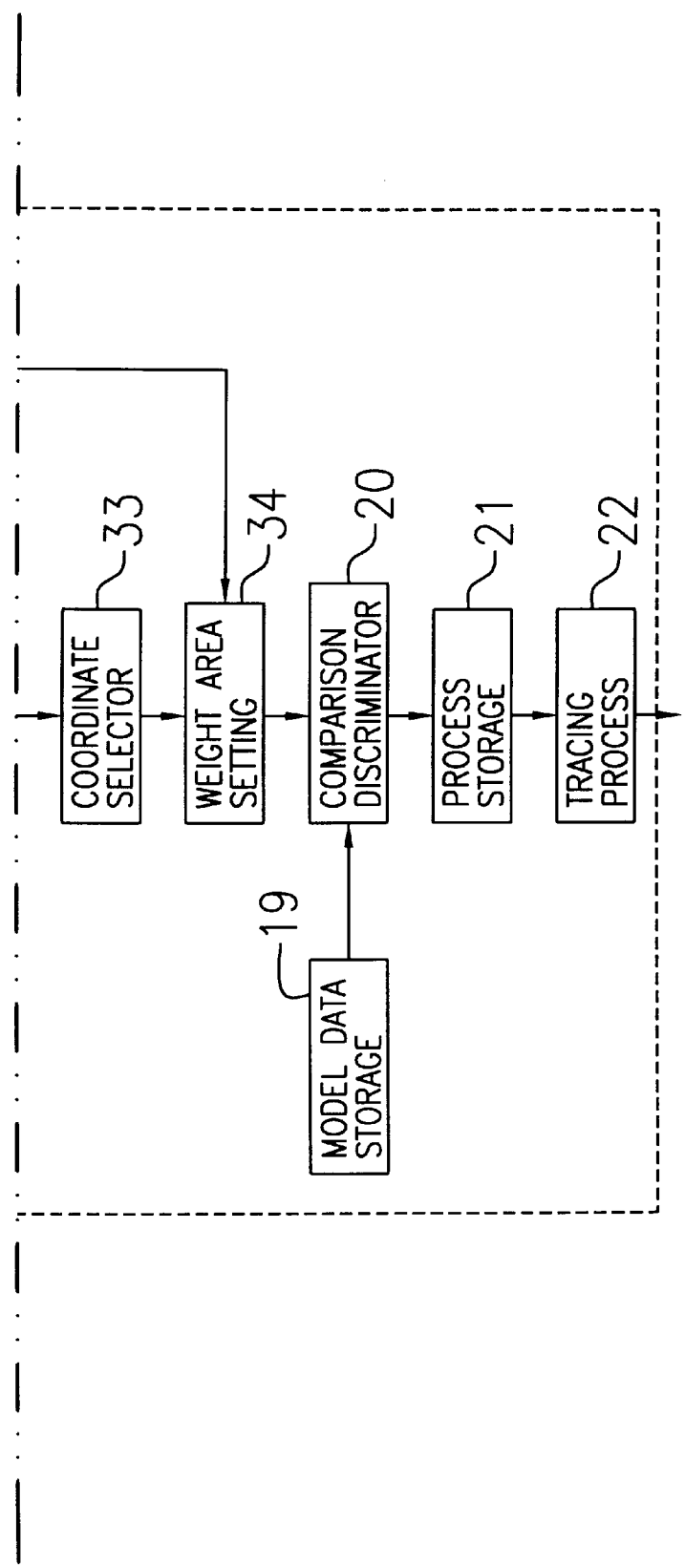

Returning to FIGS. 19A and 19B, there is shown an electronic block diagram of a traffic flow measuring device as a second embodiment of this invention. This device also discriminates vehicles passing on the respective traffic lanes from the pictures taken by two cameras 3a and 3b, and measures a traffic flow based on temporal changes of the discrimination results. In addition to the construction of FIG. 5, however, controller 4 is designed to include a character selecting unit 30, a representative point extracting unit 31, a classification processing-unit 32, a coordinate selection unit 33, and a weighting area setting unit 34, whereby the processing time is decreased and a high accurate measuring operation is performed.

The character selecting unit 30 is disposed to chose a characteristic portion for a processing candidate from the respective edge pictures stored in the edge picture memories 12a and 12b, wherein a portion where a predetermined number or more edge constructive points are connected is extracted as a characteristic portion for each edge picture.

In the chosen characteristic portions, the representative point extracting unit 31 extracts an edge constructive point corresponding to a central point of each characteristic portion as one point representing the characteristic portion.

Figure 20A:
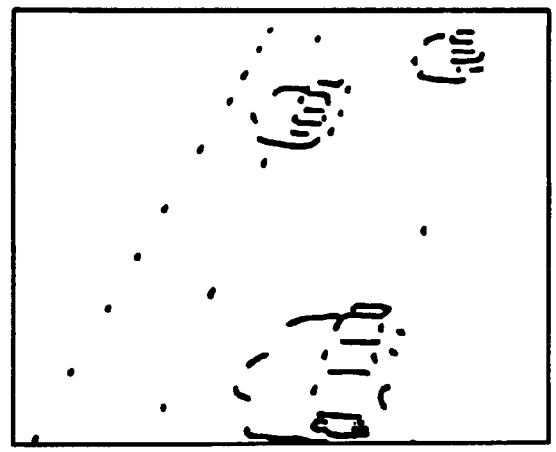
FIGS. 20A and 20B show a result of a characteristic selection.
Figure 20B:
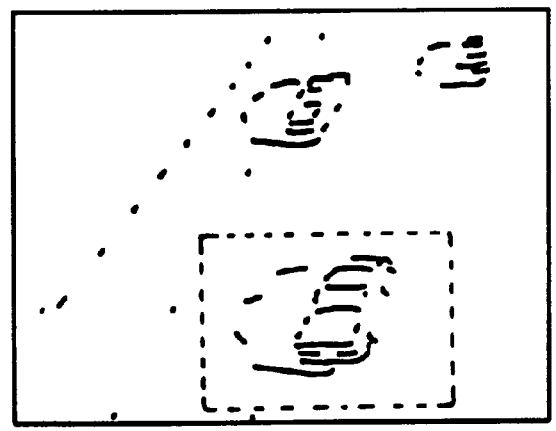
Figure 21:
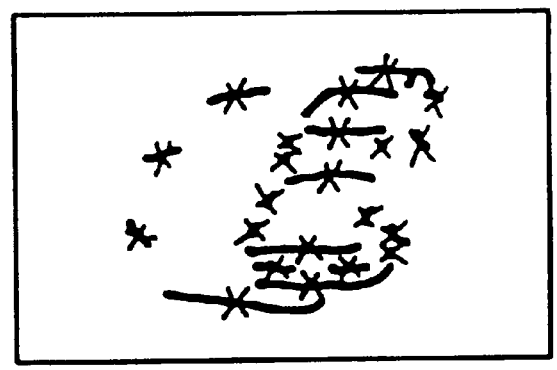
FIG. 21 shows a result of extraction of representative points.

FIGS. 20A and 20B show a result of a characteristic selecting operation about the edge pictures shown in FIGS. 8A and 8B. FIG. 21 shows a result of extraction of representative points (shown by marks "x") in the picture within an area surrounded by a dotted line in FIGS. 20B. Only these representative points are processed in the subsequent process whereby the processing speed is fairly improved.

Corresponding unit 14 executes a corresponding operation between the respective edge pictures about the extracted respective representative points, and three dimensional coordinate computing unit 15 computes three-dimensional coordinates about the respective representative points by utilizing the results of corresponding. The classification processing unit 32 executes a clustering operation employing the respective x-coordinates about the computed three dimensional coordinates, and the respective representative points are divided into groups based on the results of the clustering.

Figure 22:
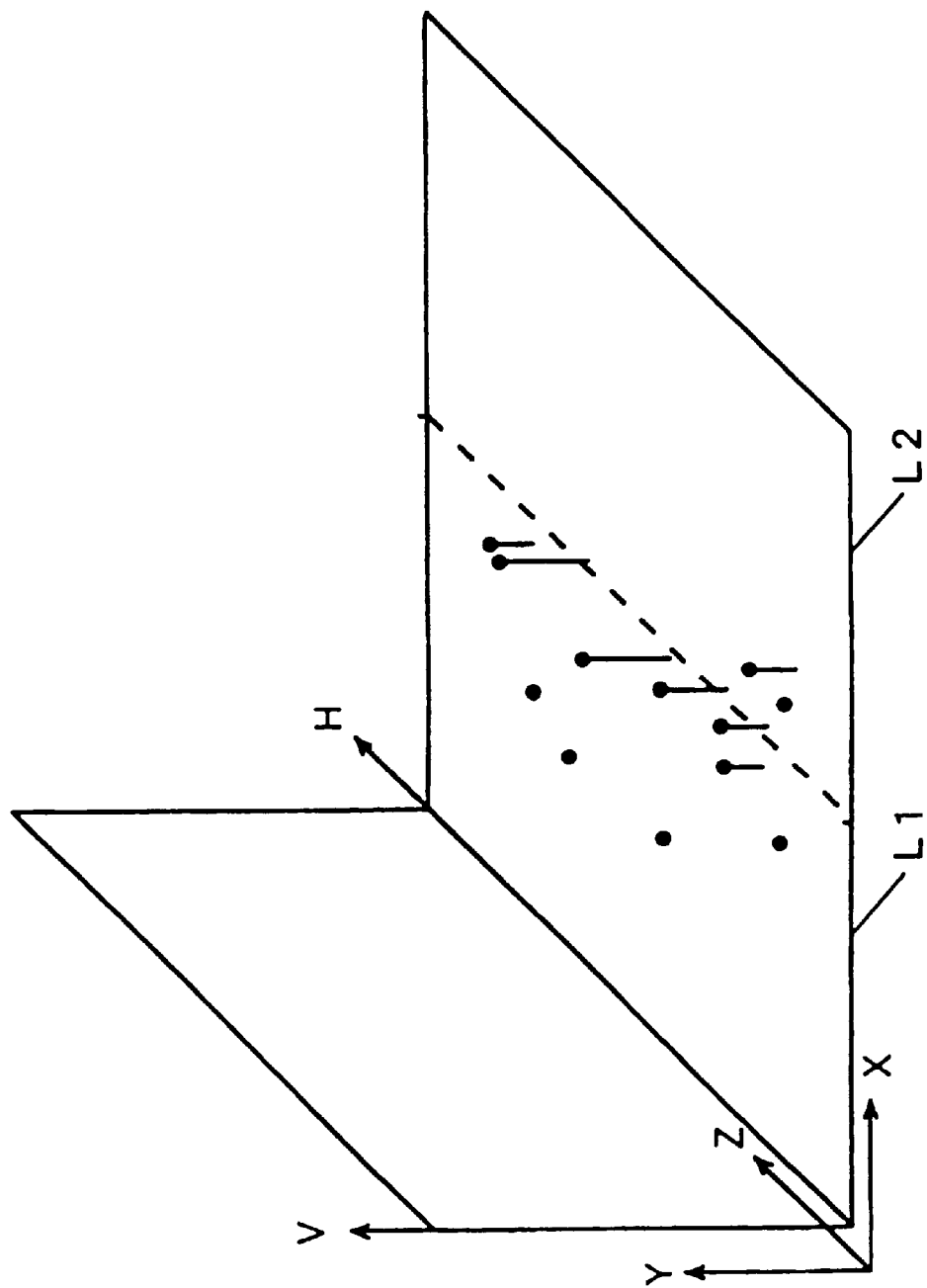
FIG. 22 shows a result of computation of three dimensional coordinates about the representative points.

FIG. 22 shows one example of a result of computation of three dimensional coordinates about the respective representative points, in which a plurality of representative points are respectively extracted in a space near a boundary of traffic lanes L1 and L2 and on an X-Z plane contacting the first lane L1.

Figure 23:
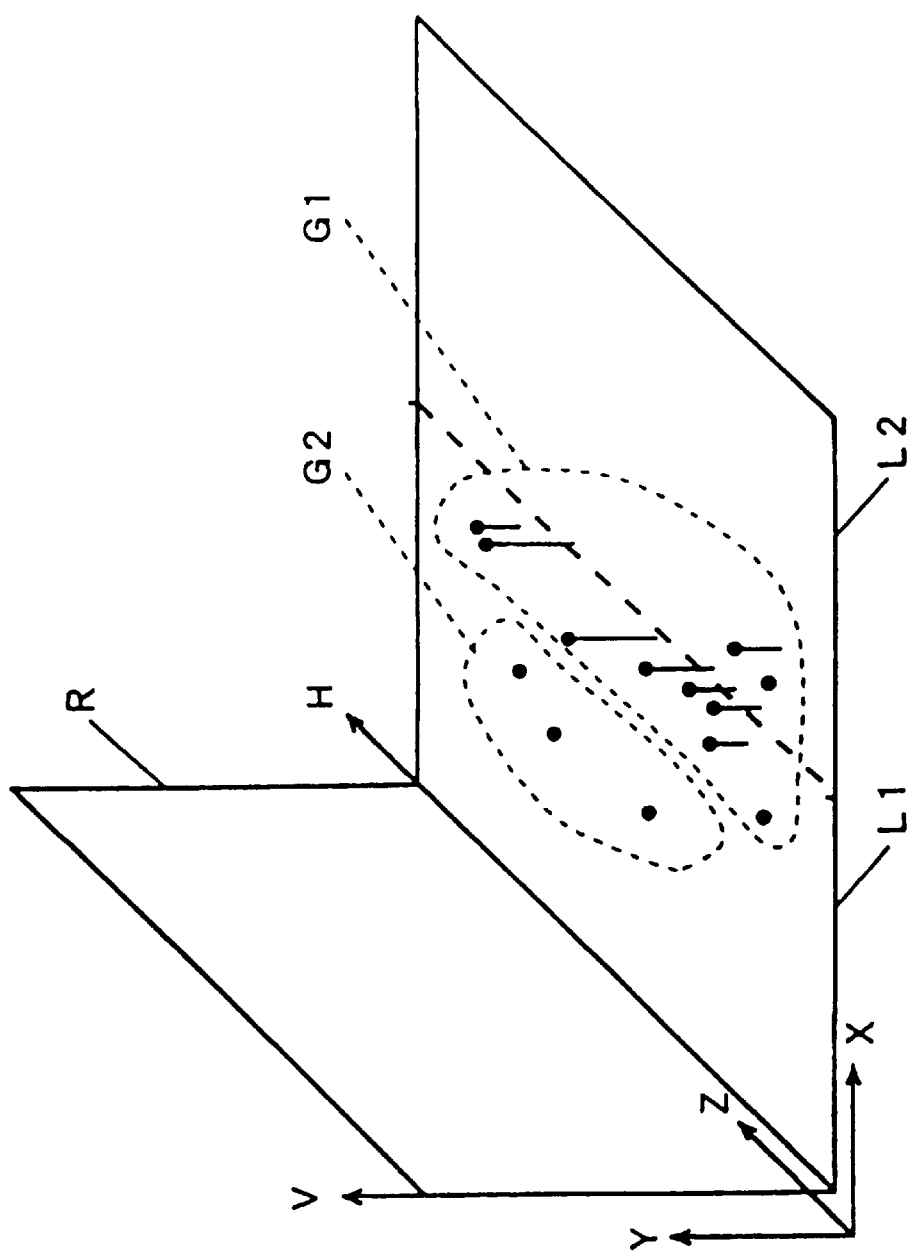
FIG. 23 shows a result of a grouping process about the respective three dimensional coordinates of FIG. 22.

FIG. 23 shows a result of a grouping process about the respective representative points of FIG. 22, in which the respective representative points located near the boundary of traffic lanes L1 and L2 are classified to a first group G1 and the respective representative points located on the X-Z plane are classified to a second group G2.

Upon the completion of this grouping process, the projection process unit 17 executes a projecting operation about the three dimensional coordinates of the representative points included in each group, for each group.

The coordinate selection unit 33 selects a representative point as a final processed object from the projection process results in each group. In this embodiment, a y-coordinate corresponding to a position of bumper of a vehicle is designed to be a threshold value, and the unit 33 chooses the point having height data higher than this threshold value among the representative points projected on the virtual perpendicular plane R as a constructive point of the vehicle.

Figure 24A:
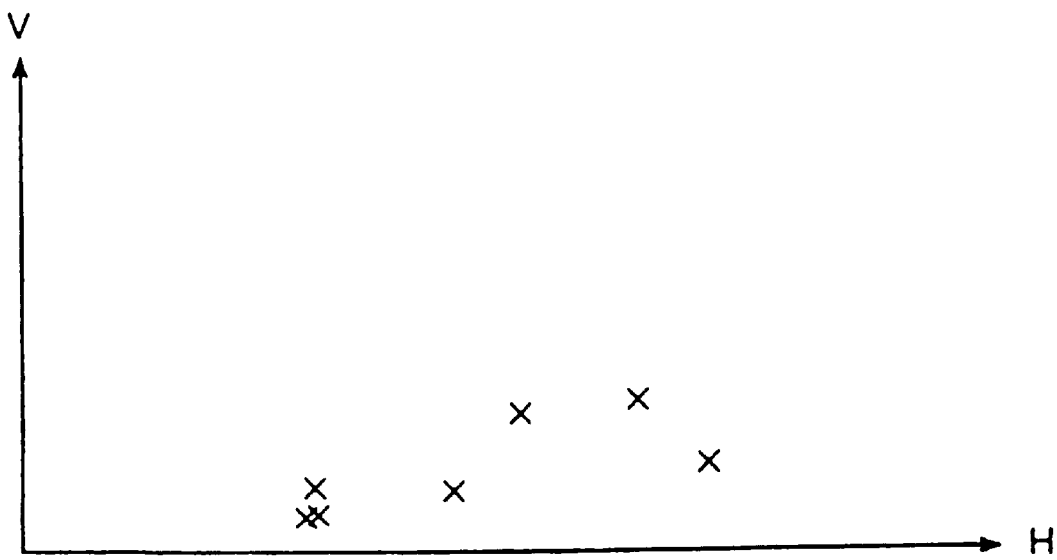
FIGS. 24A and 24B show a result of projection about the three dimensional coordinates for each group.
Figure 24B:
Figure 25:
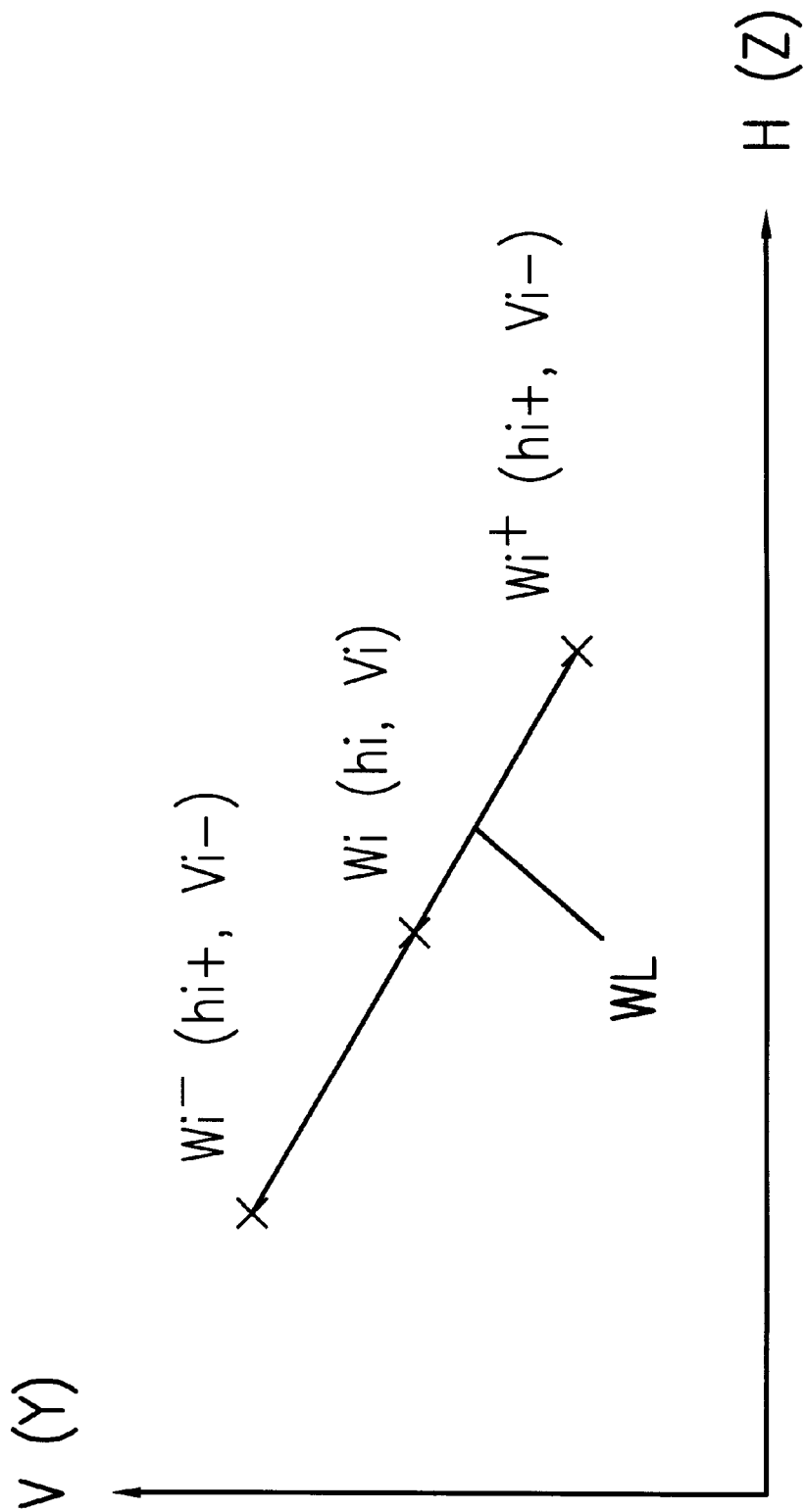
FIG. 25 shows a method for setting an area for weighting.

FIGS. 24A and 24B show a result of projection after the above-described coordinate selection process about the respective groups G1 and G2, and the respective projection points in the group G2 are removed as noise.

According to this process, the projection points relating to the object on the road plane such as the shadow of a vehicle are removed, but the weighting area setting unit 34 sets a weighting area on the remained projection points as described later. Subsequently, the comparison discriminating unit 20 compares the respective points included in the set weighting area with the respective models stored in the model data storage 19.

The setting operation of the weighting area and the comparison operation will be described in detail hereinafter in conjunction with FIGS. 25 to 29.

About each projection point, the weighting area setting unit 34 sets a line segment WL in which the projection point is expanded by a predetermined length in a direction based on a central camera parameters as an area corresponding to a width of errors developed on measuring the above-mentioned three-dimensional coordinates.

Assuming that the "i"th projection point $W_i$ has the coordinates $(h_j, v_i)$ on the H-V plane and y-coordinates of a point corresponding to the projection point $W_i$ in the respective input pictures obtained from the cameras 3a and 3b are $(y_{Ui}, y_{Li})$, the coordinates $(h_{i+}, v_{i+})$ and $(h_{j-}, v_{i-})$ of the respective end points $W_j^+$ and $W_j^-$ of the expanded line segment WL centered at the projection point $W_j$ are expressed by the following equations (8) to (11):

$$h_i- = \frac{BF}{(y_{Ui} - y_{Li} - e)\cos\theta} - \frac{y_{Li}}{y_{Ui} - y_{Li} - e}B\sin\theta \tag{8}$$

$$v_i- = H - \frac{y_{Li}}{y_{Ui} - y_{Li} - e}B\cos\theta \tag{9}$$

$$h_i+ = \frac{BF}{(y_{Ui} - y_{Li} + e)\cos\theta} - \frac{y_{Li}}{y_{Ui} - y_{Li} + e}B\sin\theta \tag{10}$$

$$v_i+ = H - \frac{y_{Li}}{y_{Ui} - y_{Li} + e}B\cos\theta \tag{11}$$

wherein B, F, H, and θ represent camera parameters similar to those employed in the above equations (2) to (4), and "e" represents an actual length expressed by one pixel on the input pictures.

Figure 26:
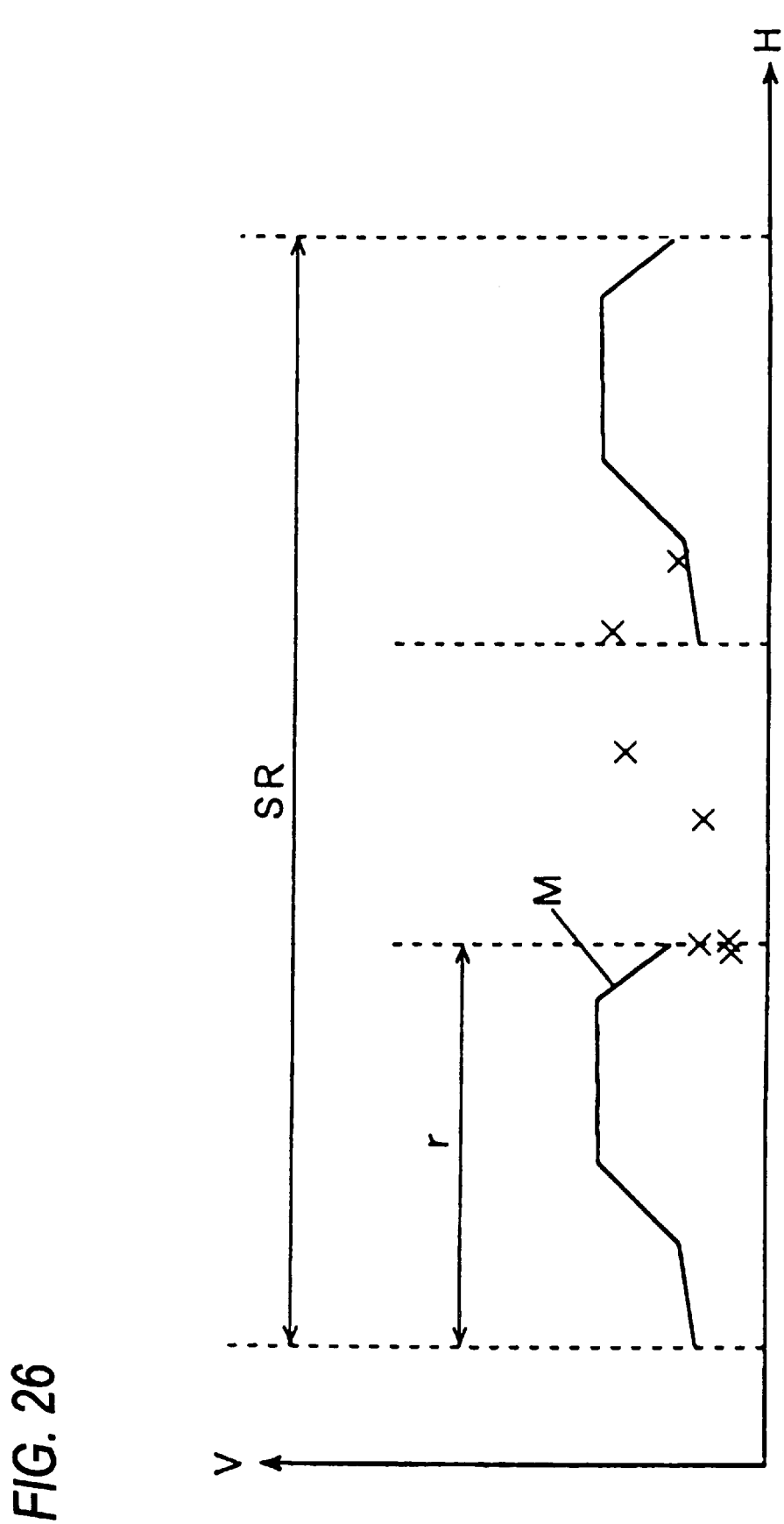
FIG. 26 shows an area for scanning models.

The comparison discriminating unit 20 sequentially reads the respective models M stored in the model data storage 19, and sets a range SR including two or more projection points within a width r of model M as a scanning range of model as shown in FIG. 26.

Figure 27A:
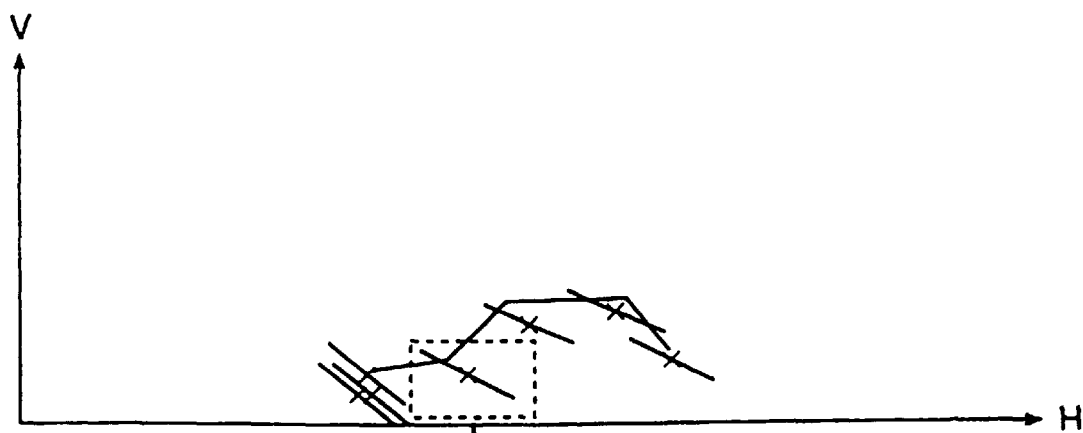
FIGS. 27A and 27B show a principle of weighted comparison processing method.
Figure 27B:
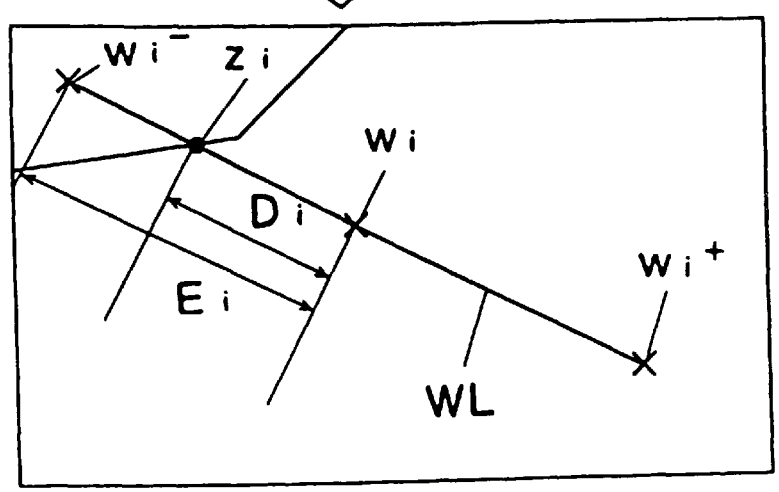
Figure 28:
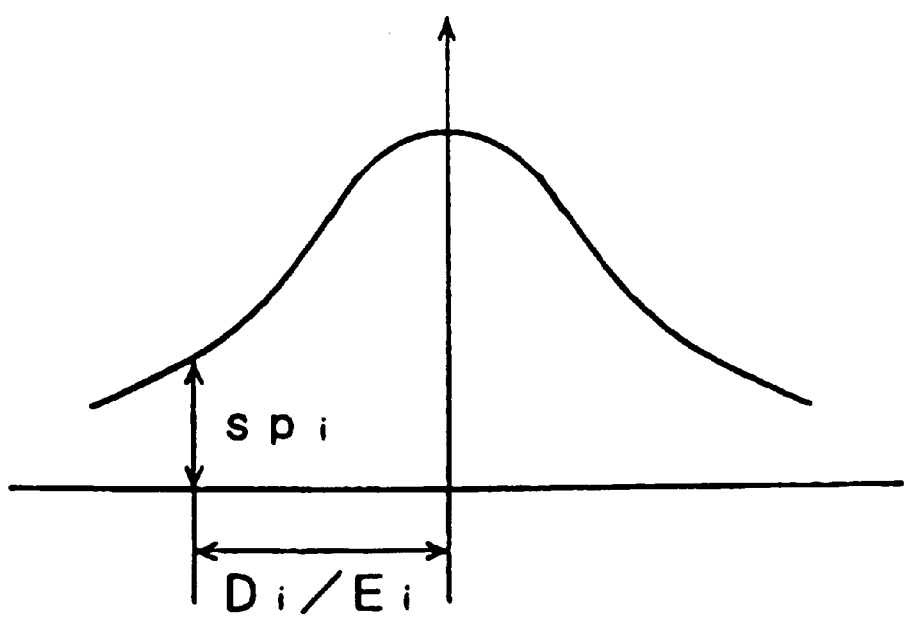
FIG. 28 shows a conception of evaluation values of the respective projection points.

Next, as shown in FIGS. 27A and 27B, the unit 20 seeks the coordinates of the intersection point $Z_i$ of the above-mentioned expanded line segment WL and the model M for each scanning position $h_i$ of the model M within the scanning range R, and computes a distance $D_i$ between the intersection point $Z_i$ and the projection point $W_i$, a distance $E_i$ between the projection point $W_i$ and an end point $W_i^+$ (or $W_i^-$) located on the side of the intersection point $Z_i$. The unit 20 applies a ratio of $D_i$ and $E_i$ computed about the projection point $W_i$ to the following equation (12), computes a probability $sp_i$ about the actual existence of model M at the intersection point $z_i$ as an evaluation value of the projection point $W_i$, and computes summation $SP_i$ of these evaluation values $sp_i$ (shown in FIG. 28) as a goodness of fit with the model of the projection data in the scanning position $h_i$:

$$sp_i = \epsilon^{-\frac{(Di/Ei)^2}{2\sigma}} \tag{12}$$

wherein Σ represents a bass of a natural constant and σ represents 2 or 3,

According to the above-mentioned method, the comparison weighted in accordance with the distance between each intersection point $Z_i$ and projection point $W_i$ is executed between the model M and the respective expanded line segment WL, and errors on computing three-dimensional coordinates are removed. The construction for this weighted comparison may be applied to the device of the first embodiment.

Figure 29:
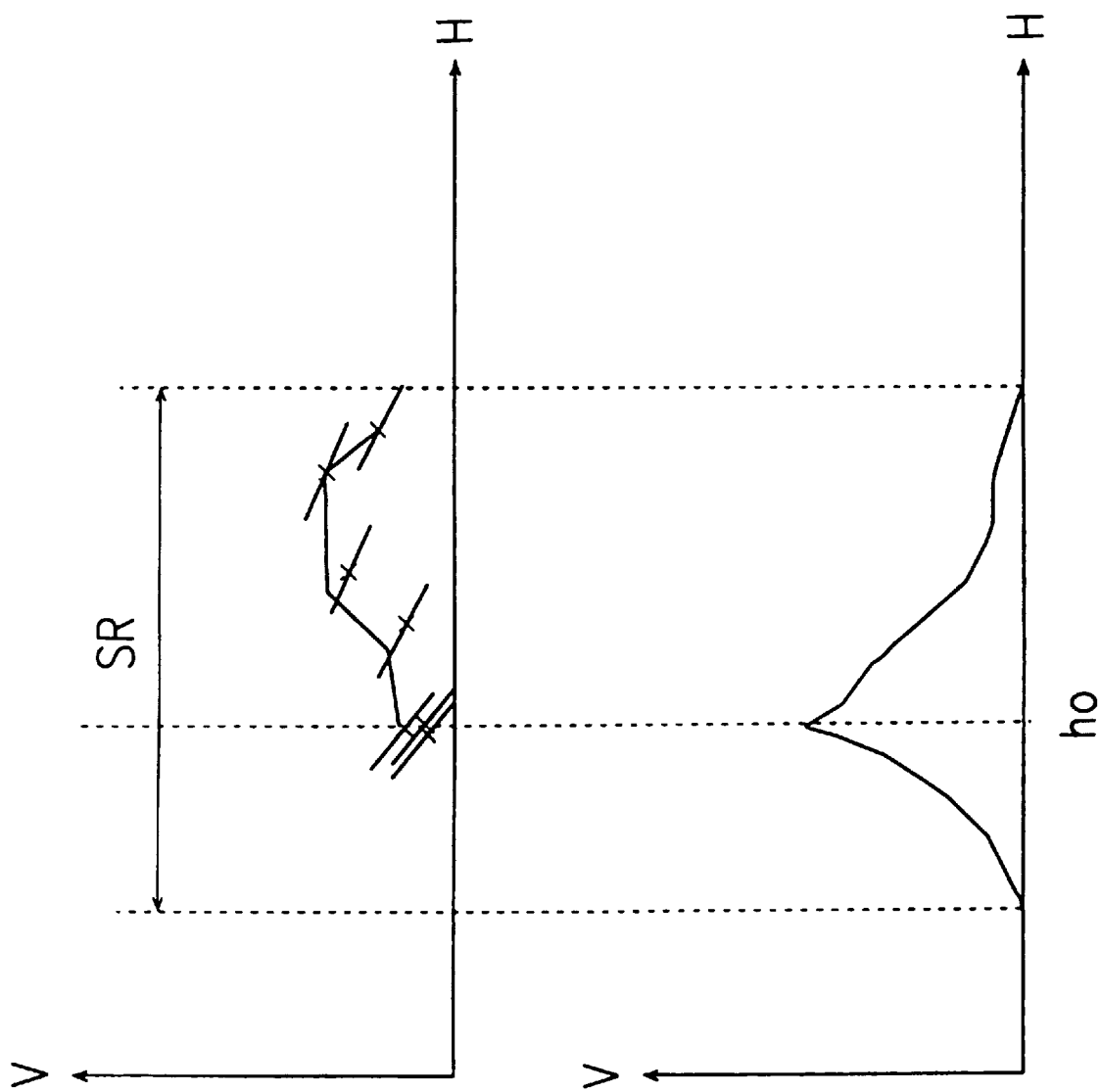
FIG. 29 shows a result of a comparison discrimination process.

FIG. 29 shows a result of a comparison process in the scanning region SR. The comparison discriminating unit 20 discriminates that the beginning portion of the vehicle type corresponding to the model M is located in a scanning position $h_o$ where the evaluation value $SP_i$ becomes the maximum value.

The result of the discrimination is stored into the process result storage 21. The operation of temporal positional changes and speed measurement of the respective vehicles is executed by the tracing process unit 22 in the same way as that of the first embodiment.

In the foregoing two embodiments edge constructive points are extracted from the input pictures from the cameras 3a and 3b, and the characteristic portions on the pictures are projected on a virtual perpendicular plane along the road to discriminate vehicles. In the case that a partial picture of the ceiling or front glass as characteristics of a vehicle is difficult to be extracted at night, the respective input pictures are converted into binaries to extract the picture of lights of vehicles a characteristic portion, and a method for measuring a traffic flow by employing the extraction result is effective.

Figure 30:
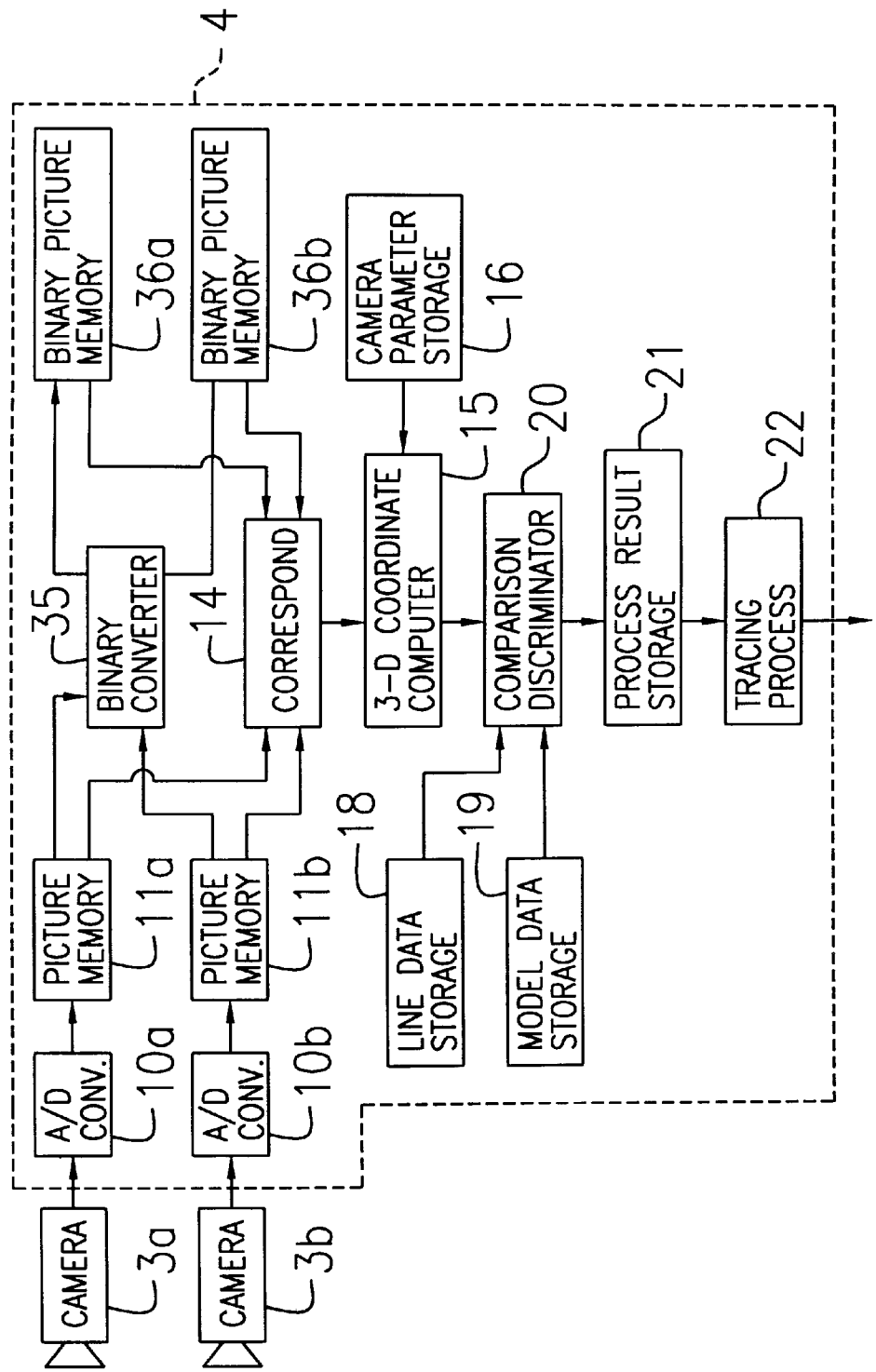
FIG. 30 shows an electronic block diagram of a traffic flow measuring device as a third embodiment of this invention.

FIG. 30 shows an electronic block diagram of a traffic flow measuring device which can measure a traffic flow at night as a third embodiment of this invention. Controller 4 of this embodiment includes a binary converter 35 and a binary picture memories 36a and 36b, instead of the edge extracting unit 13 and the edge picture memories 12a and 12b in the first embodiment.

Figure 31A:
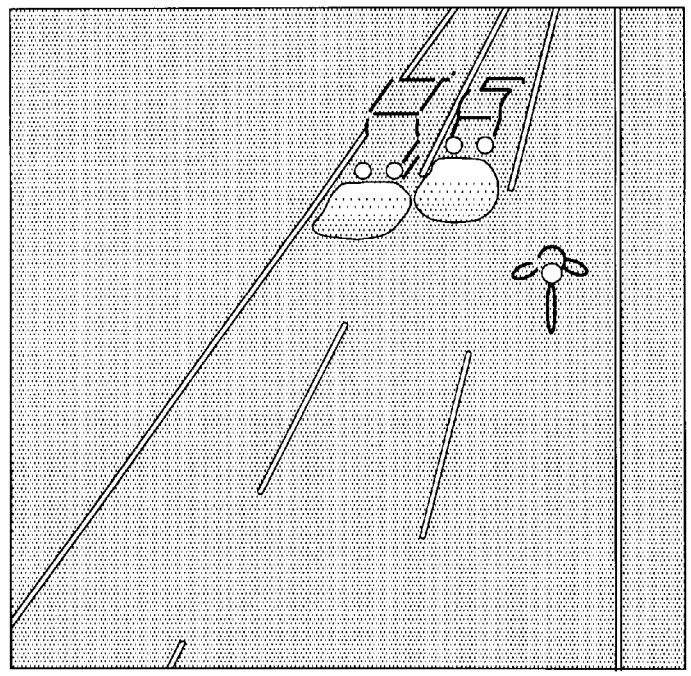
FIGS. 31A and 31B show exemplary input pictures from the respective cameras.
Figure 31B:
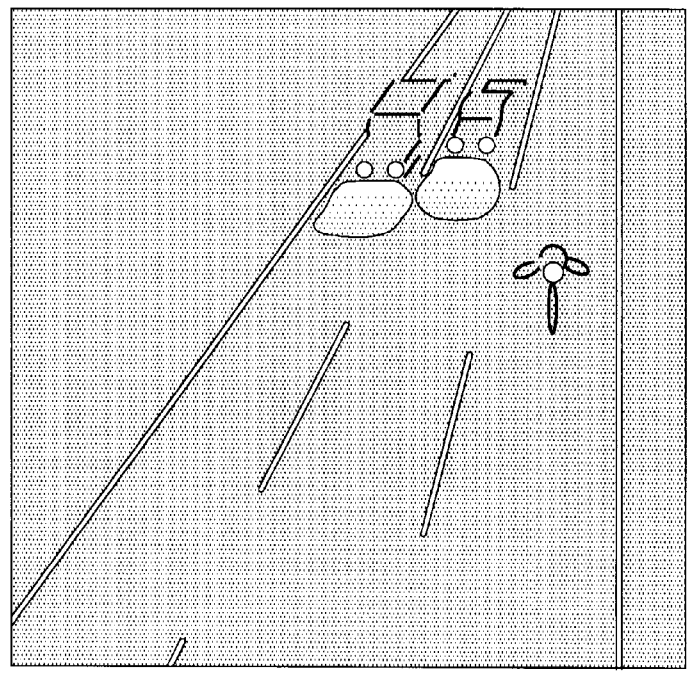
Figure 32A:
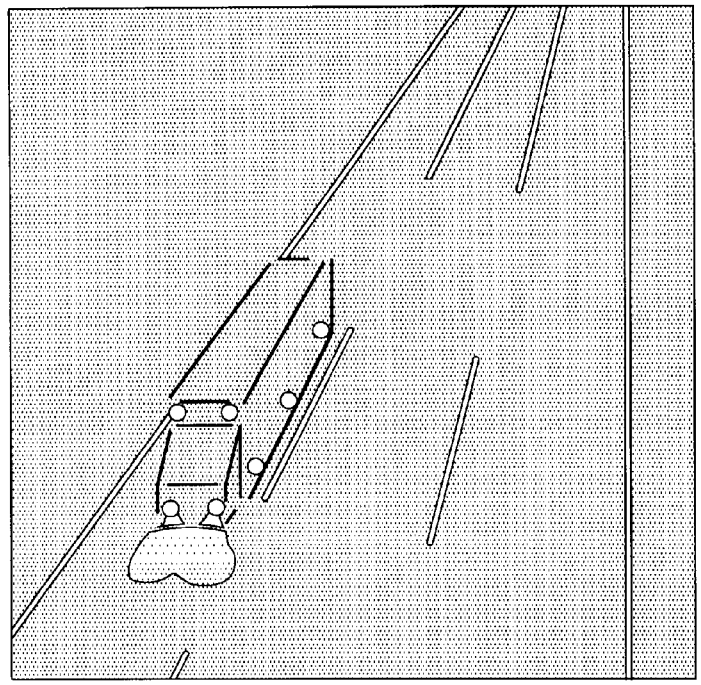
FIGS. 32A and 32B show exemplary input pictures from the respective cameras.
Figure 32B:
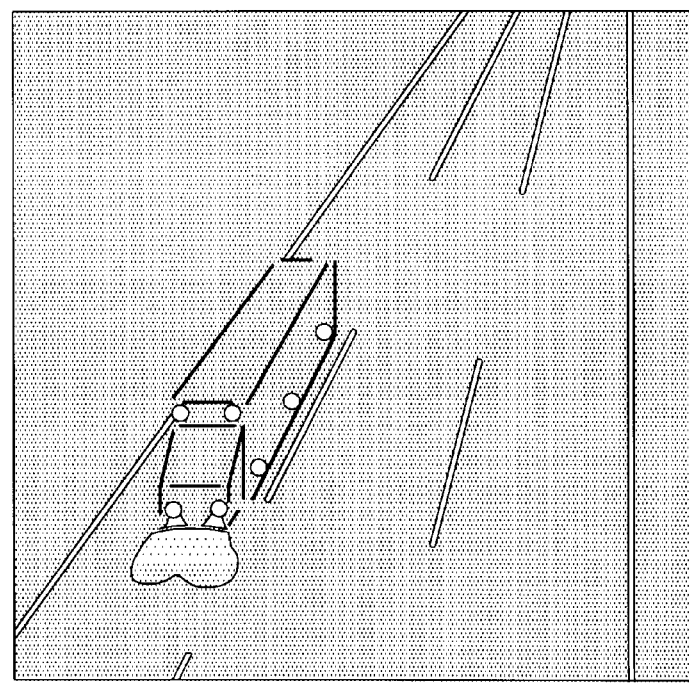

FIGS. 31A and 31B and FIGS. 32A and 32B show examples of input pictures from the respective cameras 3a and 3b. The pictures at FIGS. 31A and 32A show the first input pictures stored in the first picture memory 11a, and the picture at FIGS. 31B and 32B show the second input pictures stored in the second picture memory 11b.

The binary converter 35 is designed to convert the pixels having the luminance values exceeding a predetermined threshold value into black pixels in the input pictures stored in the memories 11a and 11b, and the converted binary pictures are stored in the binary picture memories 36a and 36b.

Figure 33A:
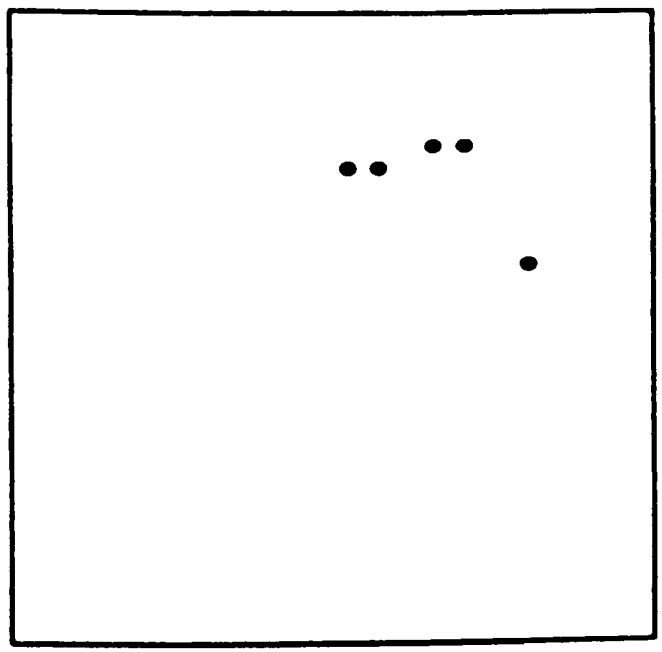
FIGS. 33A and 33B show a result of a binary process about the respective input pictures of FIG. 31.
Figure 33B:
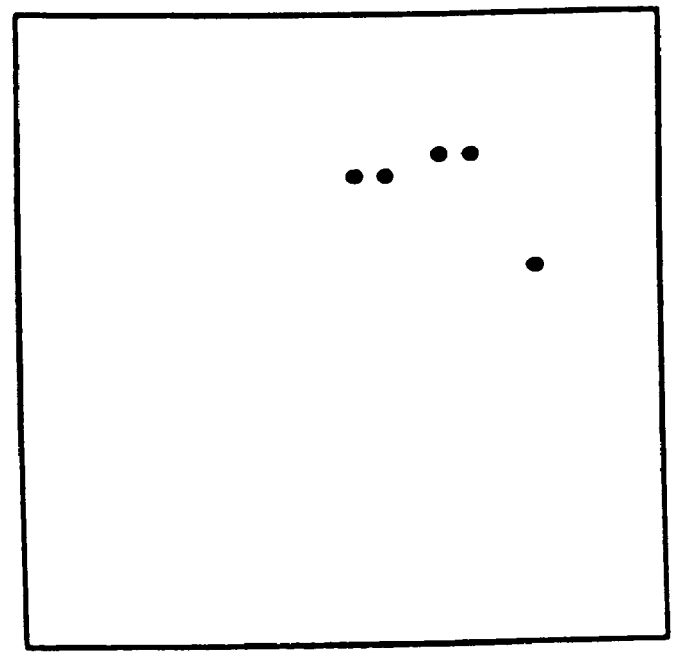

FIGS. 33A and 33B show the binary pictures converted from the input pictures of FIGS. 31A and 31B, and FIGS. 34A and 34B show the binary pictures converted from the input pictures of FIGS. 32A and 32B, in which the portions of light are extracted as black pixels.

The corresponding unit 14 executes a corresponding process between pictures about the black pixels in the respective binary pictures as mentioned above. The three-dimensional coordinate computing unit 15 computes three-dimensional coordinates about the respectively corresponded pixels. As a result, the positions of light portions included in the respective input pictures are extracted to be applied to the comparison discriminating unit 20.

The model data storage 19 stores data representing the numbers and positions of lights for each vehicle such as a compact car, a motorcycle and large size car, and the comparison discriminating unit 20 compares the storage data with the computation results by three dimensional coordinate computing unit 15 to discriminate which type of vehicle is located in which position.

Figure 34A:
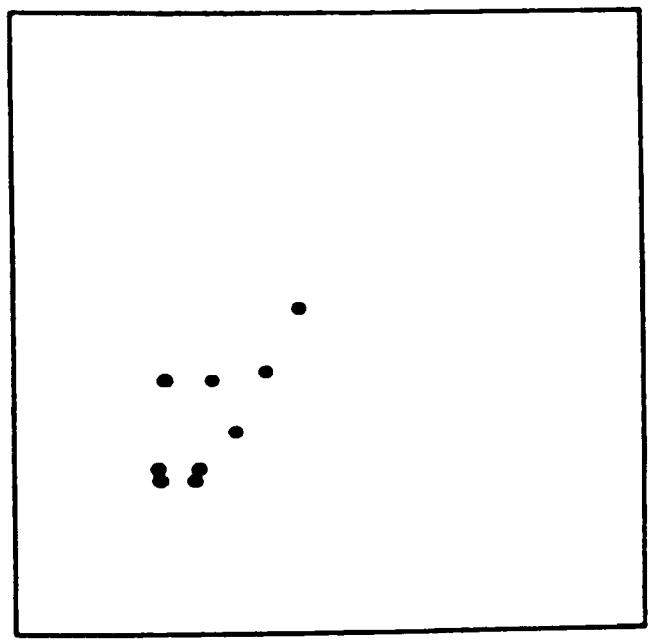
FIGS. 34A and 34B show a result of a binary process about the respective input pictures of FIG. 31.
Figure 34B:
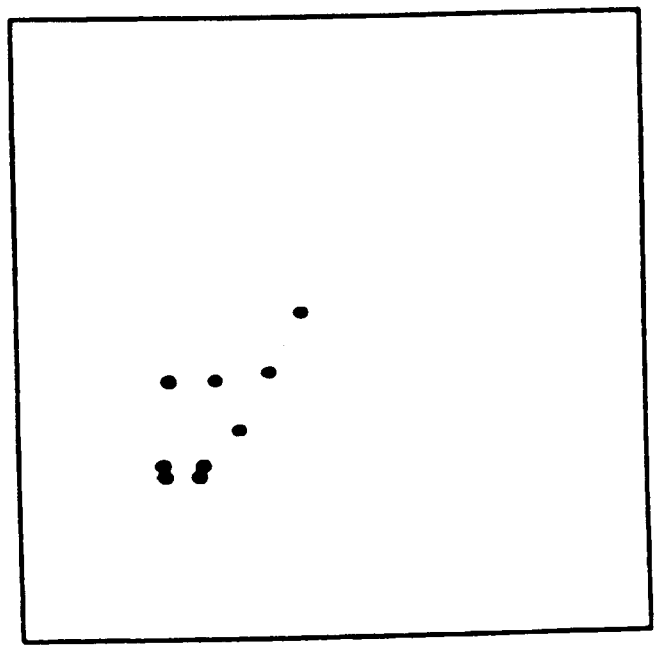
Figure 35:
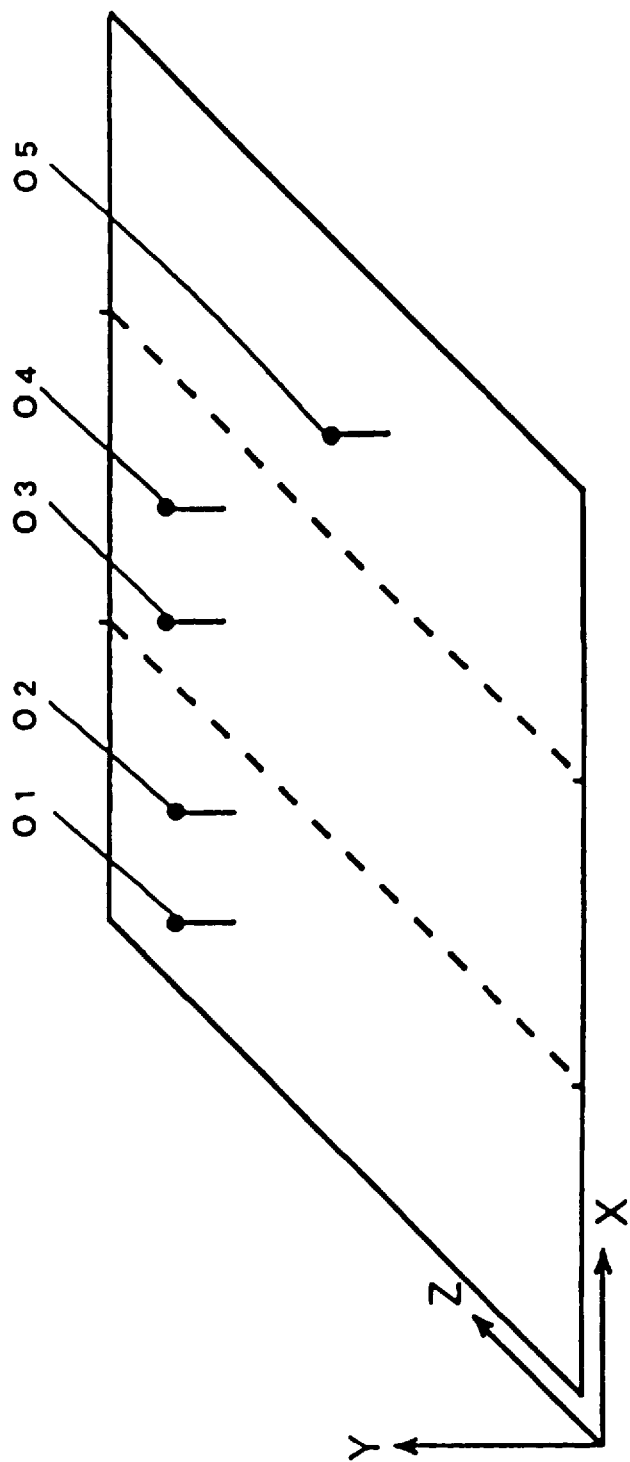
FIG. 35 shows a result of computation for three dimensional coordinates of the characteristic points.
Figure 36:
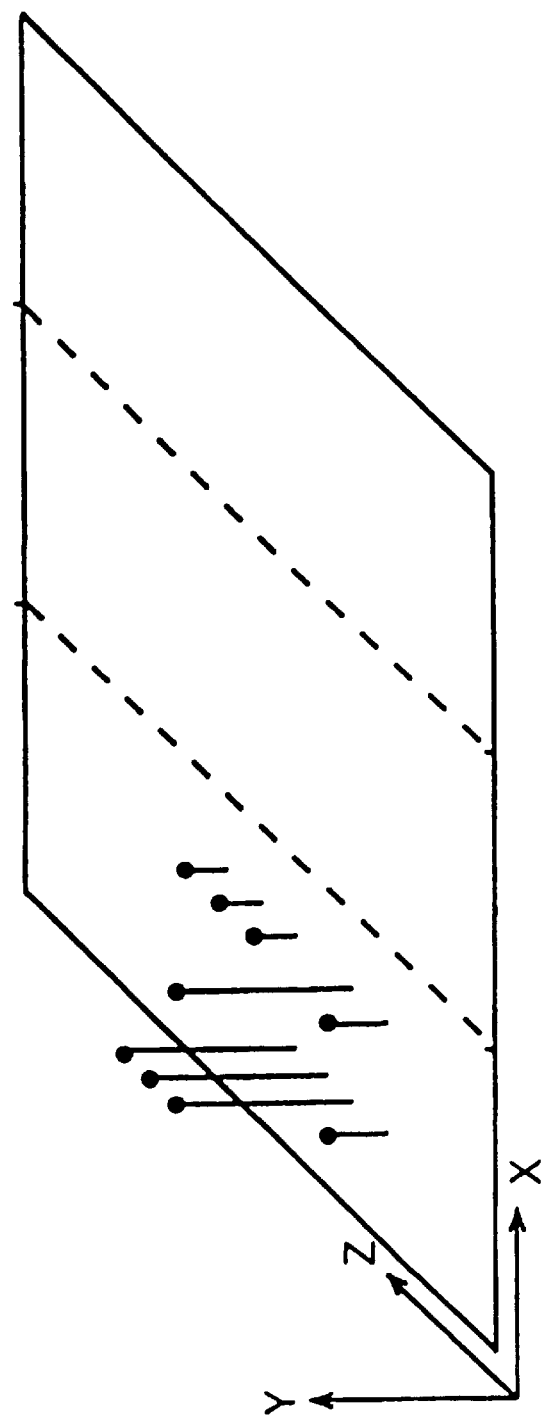
FIG. 36 shows a result of computation for three dimensional coordinates of the characteristic points.

FIG. 35 shows a result of computation for three dimensional coordinates employing the binary pictures of FIGS. 33A and 33B, and FIG. 36 shows a result of computation for three dimensional coordinates employing the binary pictures of FIGS. 34A and 34B. The mark "•" represents a point corresponding to a central point of each characteristic portion (called as "characteristic point" hereinafter). The comparison discriminating unit 20 has a recognition area from a y-coordinate corresponding to a height position of a standard bumper until a predetermined height position, and extracts a characteristic points having a y-coordinate within the recognition area as a characteristic point candidate. The unit 20 compares positional relations of the extracted characteristic points with the storage data in the model data storage 19 to discriminate the types and positions of the vehicles on road. The dotted lines in FIGS. 35 and 36 represent boundary lines of traffic lanes based on positional information stored in the traffic lane data storage 18, and based on this positional information the traffic lane located by the discriminated vehicle is identified.

When there exist a pair of characteristic points (for example, pairs of characteristic points 01–02 and 03–04 of FIG. 35) located in a position corresponding to a position just above a bumper and in parallel at an interval corresponding to a width of headlights of an ordinary automobile in a width direction of the road, the unit 20 recognizes the positions of these characteristic points as the beginning positions of ordinary automobiles. When there exists a single characteristic point (for example, a, characteristic point 05) having height data corresponding to a position just above a bumper, the unit 20 discriminates that a motorcycle is located in the position of the characteristic point. When the interval of the pair of characteristic points corresponding to headlights is larger than the interval of the headlights of ordinary automobile and a plurality of characteristic points (the respective characteristic points of FIG. 35) exist around the pair of characteristic points, the unit 20 discriminates that these characteristic points represent a large size vehicle, and further discriminates the type (truck, vane and bus) of the vehicle in view of the positional relations of the respective characteristic points.

When the shadows of headlights reflected on a wet road in the rain and night lights or traffic signs along a road are extracted as characteristic points, the y-coordinates of these characteristic points are out of the recognition area and regarded as not the characteristic points expressing any vehicle. Thus, any risk of erroneous detection of other materials than vehicles as a vehicle, and even at night vehicles can be precisely discriminated.

The results of the comparison discriminating unit 20 are sequentially stored into the process result storage 21. Subsequently, the same operations as those of the first and second embodiments are executed.

The foregoing embodiments relate to traffic flow measuring devices. The above-mentioned vehicle measuring method is not limited to the moving vehicles, but may be applied to parking vehicles.

Figure 37:
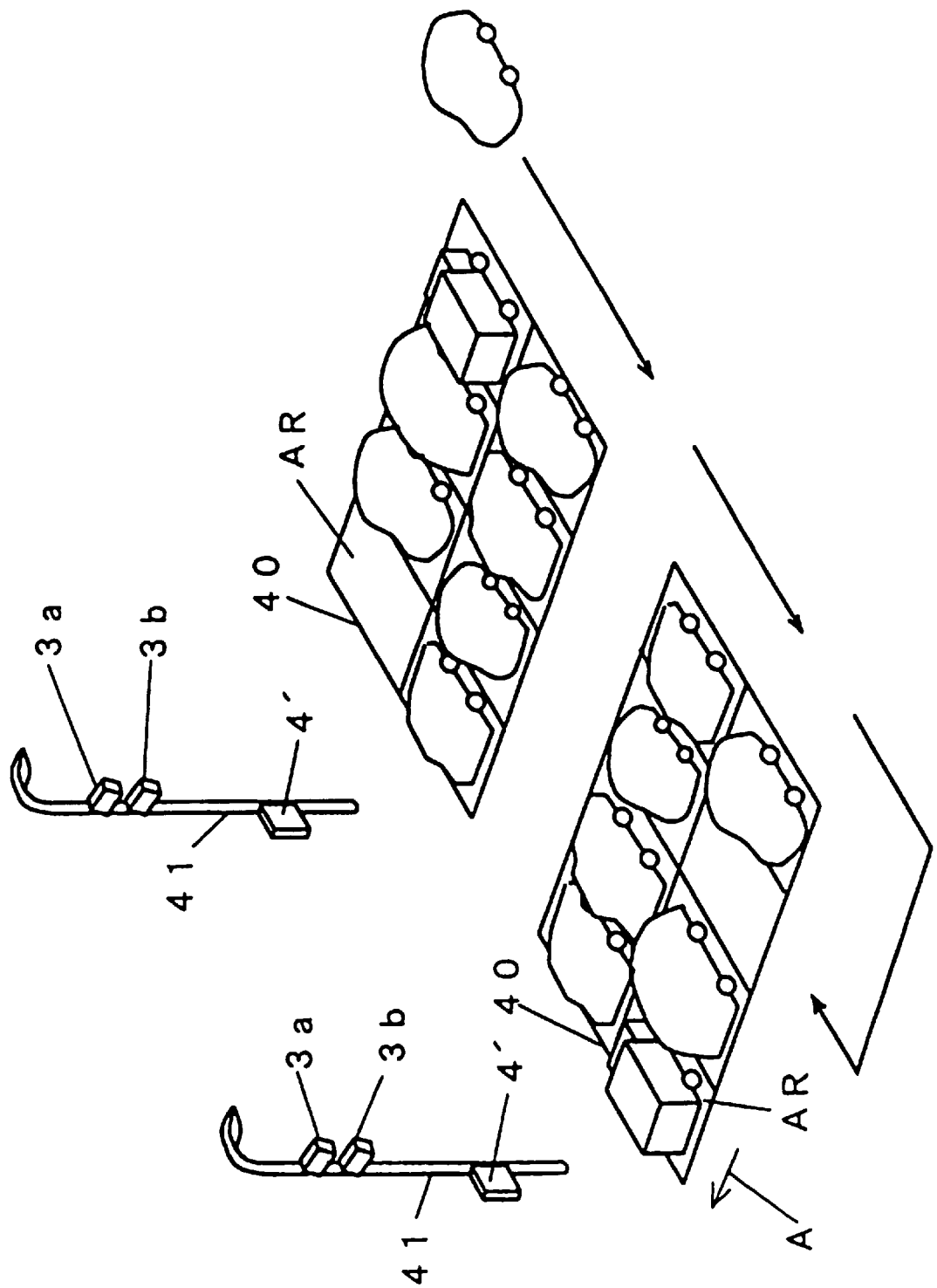
FIG. 37 shows an installation of a parking lot observing device as a fourth embodiment of this invention.

FIG. 37 shows a parking lot observing device as a fourth embodiment of this invention. The parking lot observing device is disposed near a parking lot having a plurality of parking sections (two sections in this embodiment) to discriminate the parking of vehicles. The parking lot is provided with the two parking sections 40 at a predetermined interval. Each parking section is divided into four sections in a longitudinal direction (in a direction marked with an arrow mark A in FIG. 37), and into two sections in a width direction, whereby eight parking areas AR are provided.

In this embodiment, the respective parking areas AR are observed for each parking section 40, and observation devices each consisting of cameras 3a and 3b and a controller 4' are disposed on extended lines in the longitudinal direction A of the parking section 40. The cameras 3a and 3b are mounted on lighting props 41 in the same positional relationship as one of the above. The results of measurement by the controllers 4' are transmitted to a computer at an administration center (not shown in drawings) to manage whole use of the parking lot.

Figure 38:
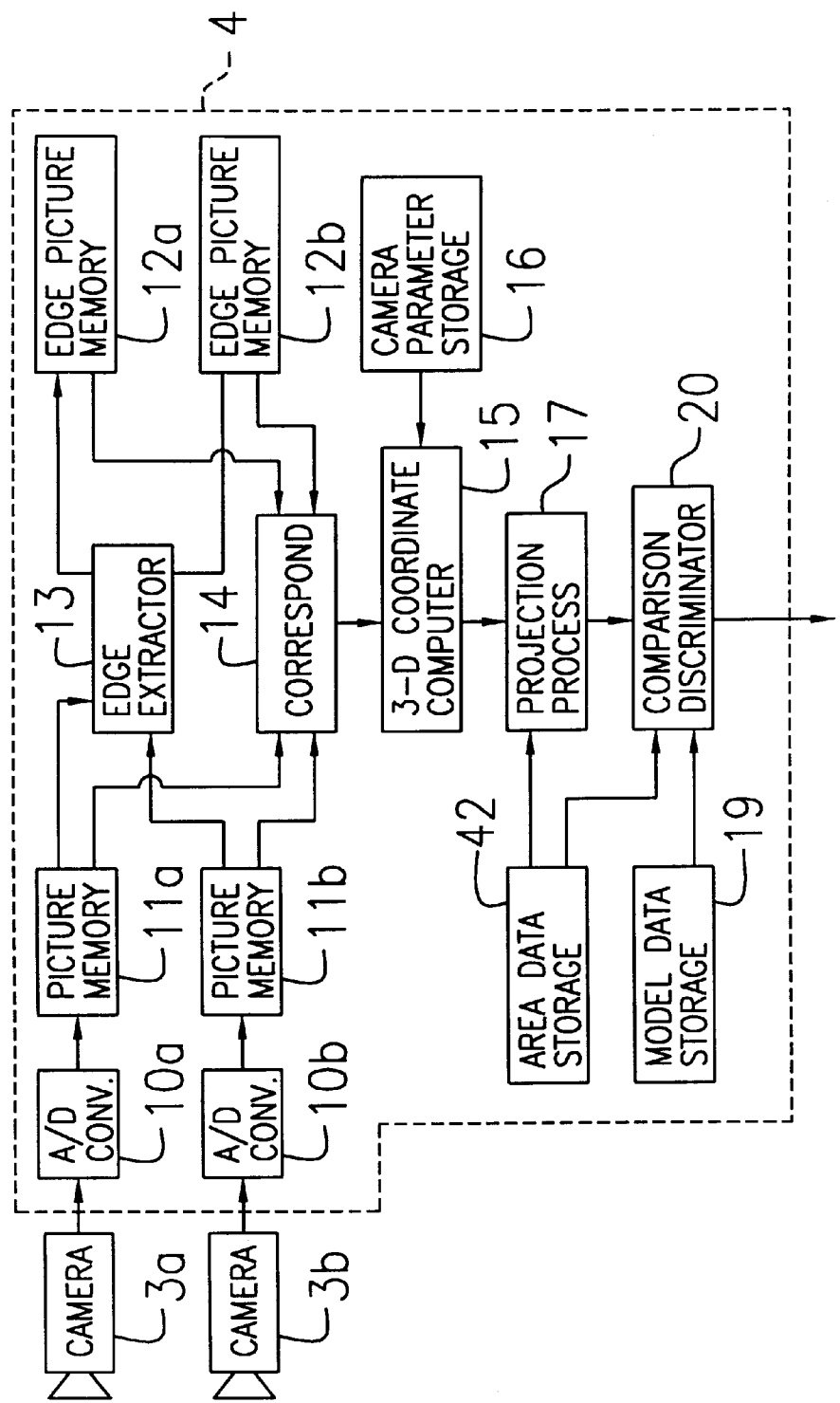
FIG. 38 shows a schematic block diagram of the parking lot observing device.

FIG. 38 shows a schematic block diagram of the parking lot observing device. The controller 4' includes A/D converters 10a and 10b, picture memories 11a and 11b, edge memories 12a and 12b, an edge extracting unit 13, a corresponding unit 14, a three-dimensional coordinate computing unit 15, a camera parameter storage 16, a projection process unit 17, a model data storage 19, and a comparison discriminating unit 20, which are the same components as those of FIG. 5. The controller 4' further includes an area data storage 42 for storing positional information of the respective parking areas AR (for example, coordinates of the respective vertexes).

Figure 39A:
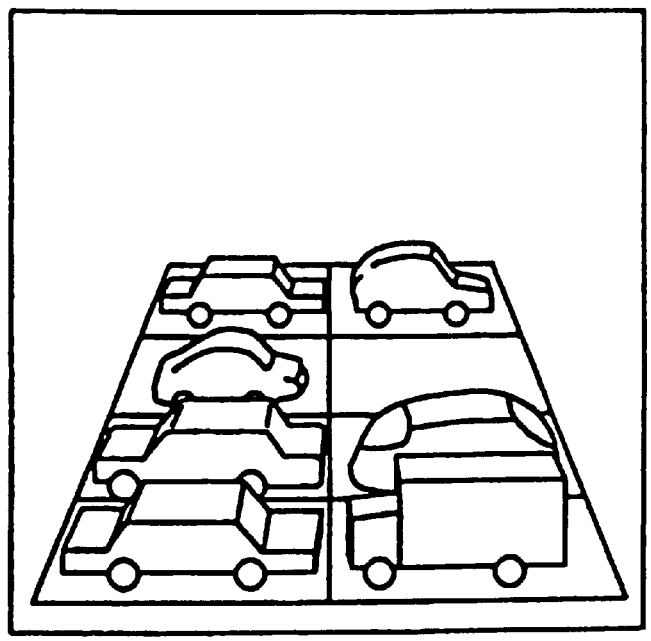
FIGS. 39A and 39B show one example of input pictures from the respective cameras.
Figure 39B:
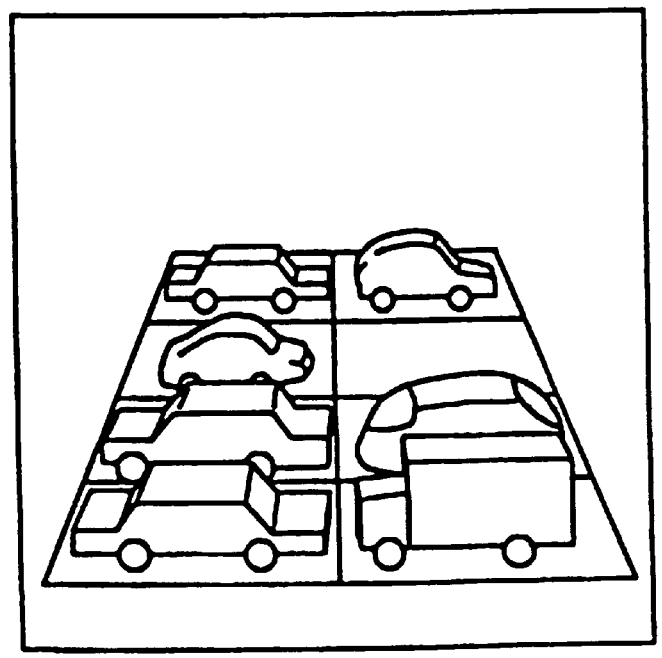
Figure 40A:
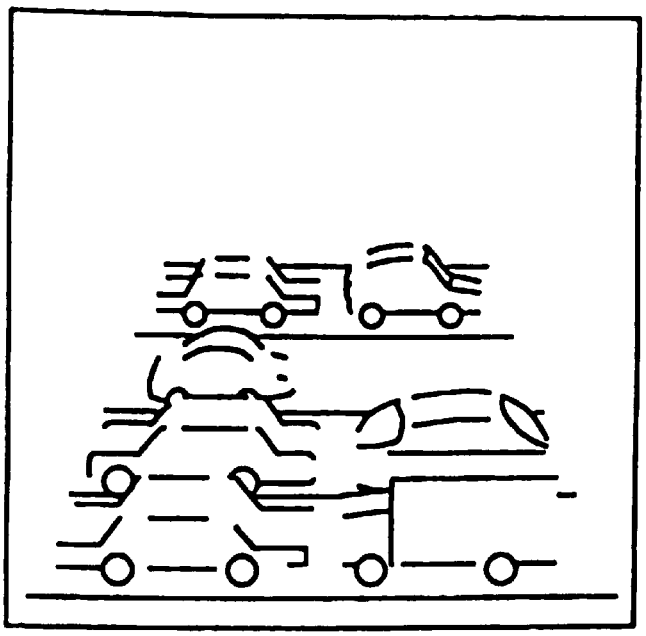
FIGS. 40A and 40B show one example of edge pictures.
Figure 40B:
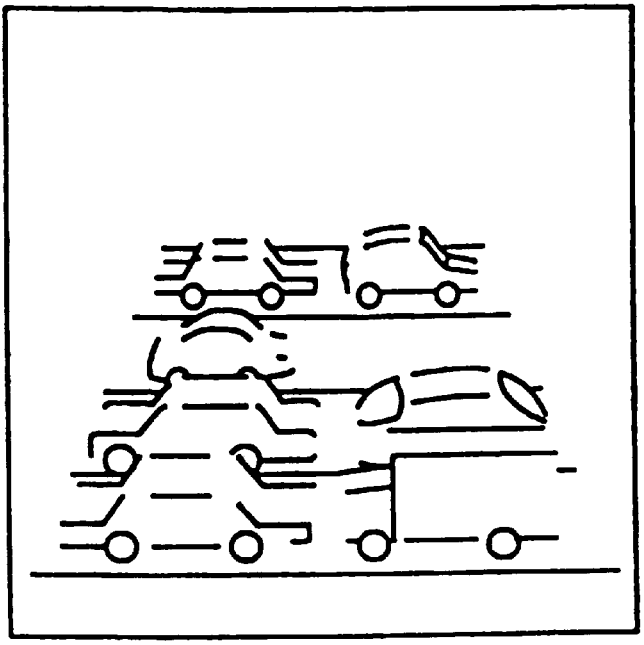

When input pictures as shown in FIGS. 39A and 39B are stored in the memories 11a and 11b, the edge extracting unit 13 extracts edge constructive points in a horizontal direction about the input pictures in the same method as those of the above-mentioned first and second embodiments. As a result, edge pictures as shown in FIGS. 40A and 40B are produced, and stored in the edge picture memories 12a and 12b.

The corresponding unit 14 and the three-dimensional coordinate computing unit 15 execute a corresponding operation between pictures about each edge constructive point and compute three-dimensional coordinates of each corresponded point.

The projection process unit 17 sets a virtual perpendicular plane R' along the longitudinal direction A of the parking section, viz., a width direction of each parking area AR, and projects the computed three-dimensional coordinates on the perpendicular plane R'. This projection operation is executed based on the storage data in the area data storage 42 for each line of the parking section 40.

Figure 41:
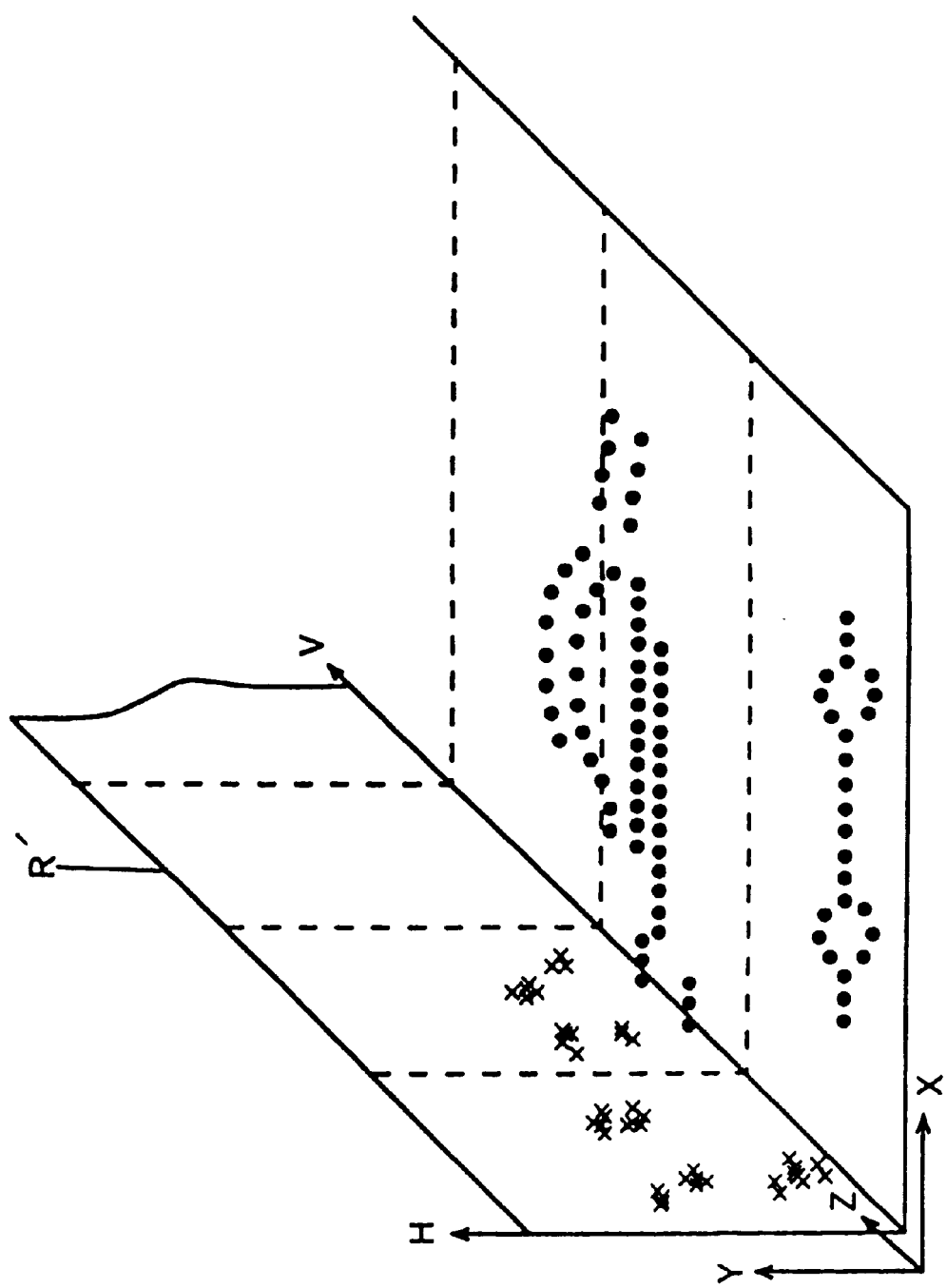
FIG. 41 shows a relation between the computation result of three dimensional coordinates and the projecting process.
Figure 42:
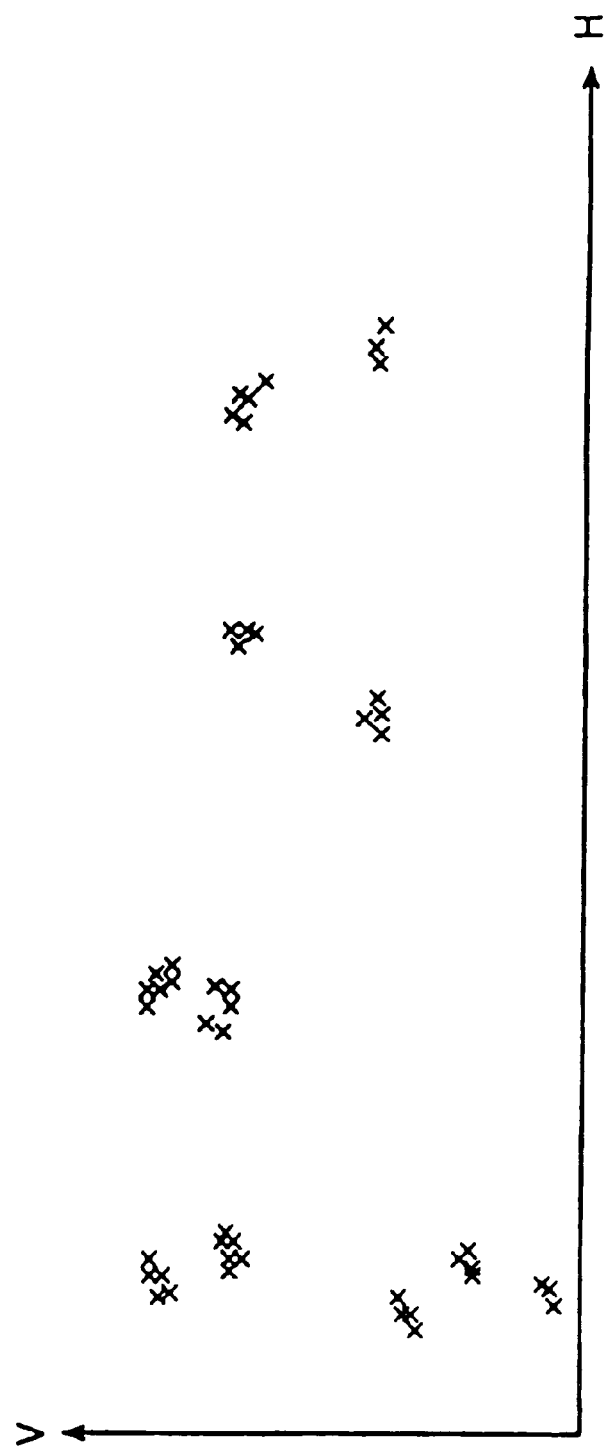
FIG. 42 shows a result of projection.

FIG. 41 shows one example of the above projection operation, and FIG. 42 shows a front view of the virtual perpendicular plane R' applied by the projection operation. The projection data representing a front shape or a rear shape of a vehicle within each parking area is extracted separately.

As shown in FIGS. 43A and 43B, the model data storage 19 stores model of a front shape or a rear shape for each type of vehicle, and the comparison discriminating unit 20 sequentially scans the respective models on the virtual perpendicular plane R' to discriminate the vehicles in the same way as one of the above-mentioned first embodiment.

If the unit 20 discriminates the position of the vehicle corresponding to one of the models, it collates the storage data in the area data storage 42, recognizes which parking area corresponds to the discriminated position, and eventually transmits to an administrative center the data representing which type of vehicle parks in which parking area.

Though in this embodiment the virtual perpendicular plane R' is set in the width direction of the parking area and a front shape of each vehicle is projected, the virtual perpendicular plane may be set in a longitudinal direction of the parking area to project a side shape of each vehicle. Moreover, though in this embodiment the projection operation is simultaneously executed about parking areas in the same line, it may be individually executed for each parking area.

If in addition to this parking lot observation process the vehicles moving on peripheral paths around each parking section 40 are discriminated by employing the above-mentioned first and second embodiments, a vehicle going to park and a vehicle going to leave the parking lot can be discriminated and total administration of the parking lot is possible.

The parking lot observing device of this embodiment discriminate vehicles based on the projecting operation of three-dimensional coordinates, but may be so constructed to discriminate vehicles based on height data shown by the respective coordinates computed instead of the projection operation.

Figure 44:
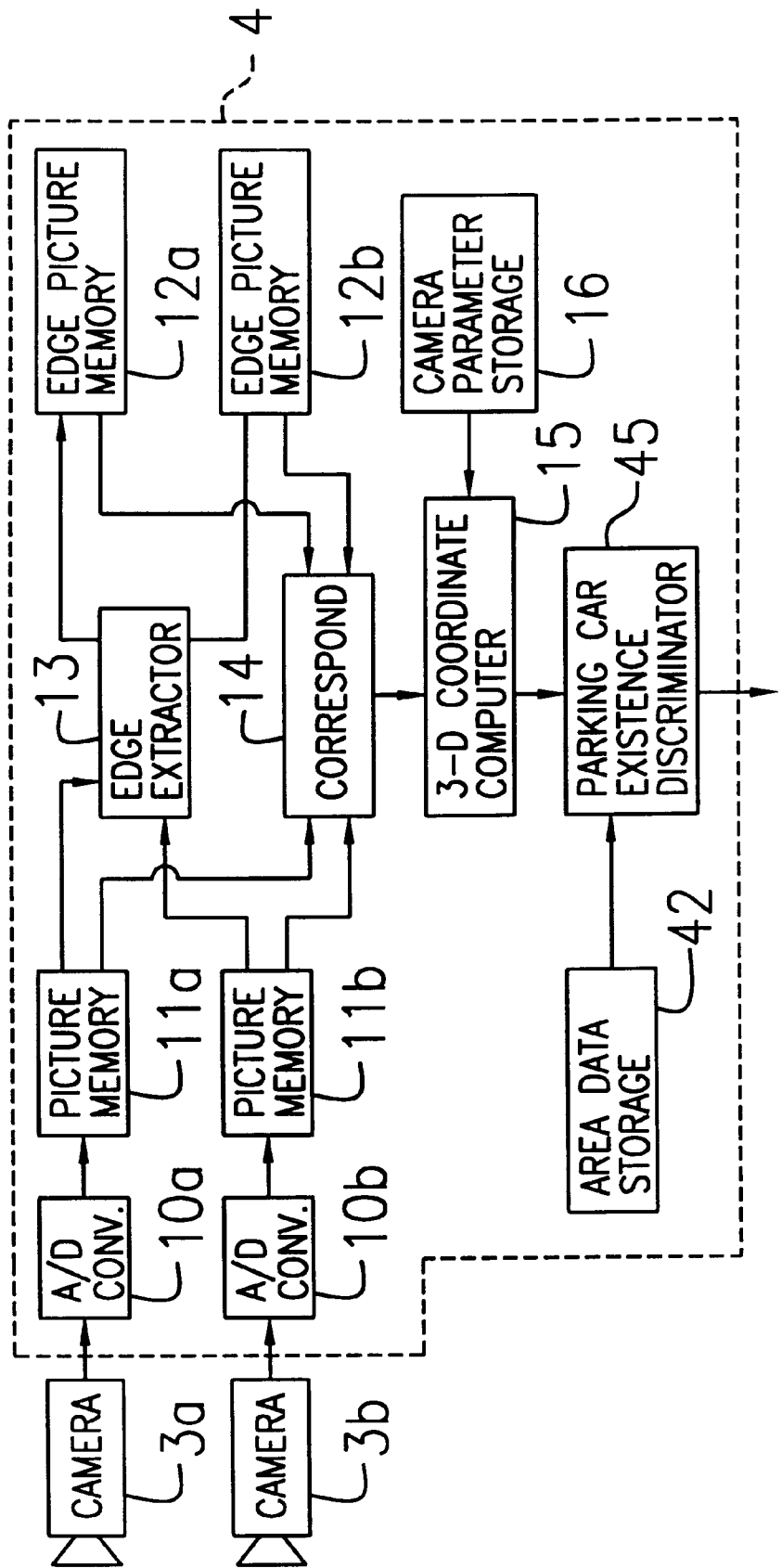
FIG. 44 shows a schematic block diagram of a parking lot observing device as a fifth embodiment of this invention.

FIG. 44 shows so constructed parking lot observing device as a fifth embodiment of this invention, Controller 4' is provided with a parking car existence discriminating unit 45 for discriminating, based on the computed three dimensional coordinates and the positional information of each parking area, whether or not any vehicle is parking at each parking area. Other components having the same constructions as those of the foregoing embodiments are represented by the same reference numerals and their detailed explanation is omitted for simplification.

Figure 45A:
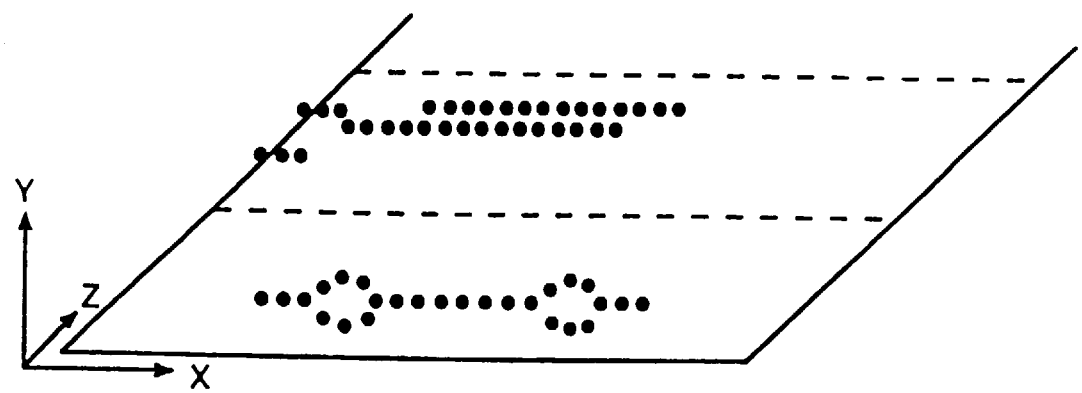
FIGS. 45A and 45B show a result of grouping three dimensional coordinates.
Figure 45B:
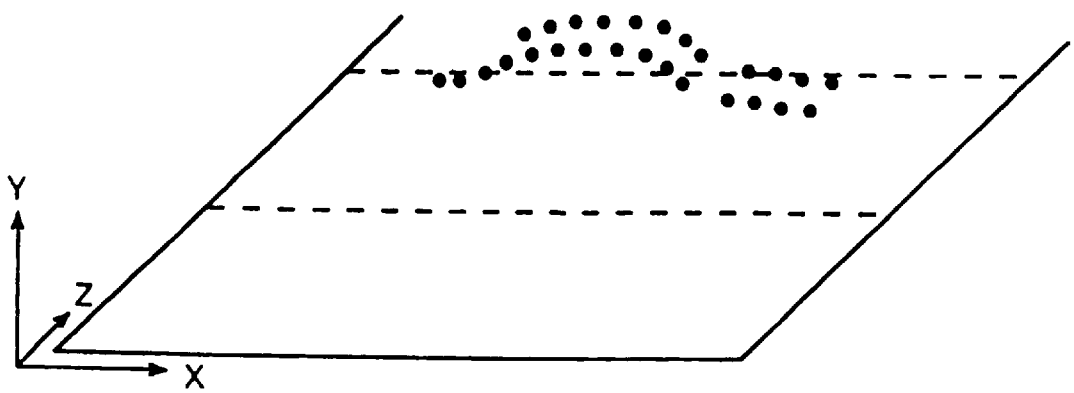

The parking car existence discriminating unit 45 divides the respective computed three-dimensional coordinates into groups for each parking area based on the positional information of the respective parking areas AR stored in the area data storage 42. For example, if the computation result of three dimensional coordinates shown in FIG. 41 is divided into groups, it is shown in FIGS. 45A and 45B. Moreover, about the "m"th classified group $g_m$, the unit 45 computes the number $PT_m$ of three-dimensional coordinate points included in the group and an average value $AD_m$ of height data of these coordinate points, compares the computed data $PT_m$ and $AD_m$ with a predetermined threshold value to discriminate whether or not any vehicle exists within the parking area AR corresponding to the group $g_m$.

The number $PT_m$ of the three-dimensional coordinate points is compared with a threshold value $TH_1$ which is set corresponding to an average number of the edge constructive points of a vehicle. The height average value $AD_m$ is compared with the two kinds of threshold values $TH_2$ and $TH_3$, in which the threshold value $TH_2$ is set by a value corresponding to an average height of ordinary automobiles and the threshold value $TH_3$ is set by a value corresponding to an average height of large sized vehicles.

When in the group $g_m$ the above-mentioned $PT_m$ exceeds the threshold value $TH_l$ and $AD_m$ is between the threshold values $TH_2$ and $TH_3$ the unit 45 discriminates that an ordinary car exists at the parking area AR corresponding to the group $g_m$. When $PT_m$ exceeds the threshold value $TH_l$ and $AD_m$ is equal to or larger than the threshold value $TH_2$, the unit 45 discriminates that a large sized vehicle exists at the parking area AR corresponding to the group $g_m$.

When $PT_m$ is equal to or smaller than the threshold value $TH_1$ or $AD_m$ is equal to or smaller than the threshold value $TH_2$, the unit 45 discriminates that no vehicle exists at the corresponding parking area.

The device in the foregoing embodiments discriminates vehicles on road or within parking area, but may be modified to discriminate various kinds of objects other than vehicles and employ same methods to measure temporal positional changes of the objects.

While the invention has been described and illustrated with respect to certain embodiments which give satisfactory results, it will be understood by those skilled in the art, after understanding the purpose of the invention, that various other changes and modifications may be made without departing from the spirit and scope of the invention, and it is therefore, intended in the appended claims to cover all such changes and modifications.

What is claimed is:

1. A object observing method for observing an object comprising a first step of simultaneously taking a picture by two or more cameras directed toward a predetermined observation position to extract a characteristic portion in each of the respective taken pictures, a second step of corresponding said extracted characteristic portion in the picture to the pictures, a third stop of measuring said corresponded characteristic portion in three-dimensions to extract its three-dimensional coordinates, a fourth step of projecting the three-dimensional coordinates of said extracted characteristic portion on a virtual perpendicular plane vertically positioning on a plane contacting said object, and a fifth step of comparing said projected data with predetermined two-dimensional model data to discriminate said object.

2. An object observing method according to claim 1, in which said fourth step of projecting is a step of dividing said three-dimensional coordinates of the respective characteristic portions into groups based on a positional relationship on a plane contacted by said object, and of projecting the three-dimensional coordinates included in the groups on said virtual perpendicular plane for each of the groups.

3. An object observing method according to claim 1 or 2, in which said fifth step of comparing is a step of setting a predetermined region including the respective projection points formed on said virtual perpendicular plane by the projecting processing of said fourth step, and of weighting the respective points based on the positional relationship of the respective points in said set region with said projection points to be compared with said two-dimensional model data.

4. An object observing method for observing an object comprising a first step of simultaneously taking a picture by two or more cameras directed toward a predetermined observation position to extract a characteristic portion in each of the respective taken pictures, a second step of specifying a point showing the representative characteristics about said extracted characteristic portion of the picture, a third step of corresponding said specified representative point to a picture, a fourth step of measuring in three-dimensions for each of said corresponded representative points to extract its three-dimensional coordinates of the respective representative points, a fifth step of projecting the three-dimensional coordinates of said extracted representative points on a virtual perpendicular plane vertically positioning on a plane contacting said object, and a sixth step of comparing said projected data with predetermined two-dimensional model data to discriminate said object.

5. An object observing method according to claim 1, in which said fourth step of projecting is a step of dividing said three-dimensional coordinates of the respective representative points into groups based on a positional relationship on a plane contacted by said object, and of projecting the three-dimensional coordinates included in the groups on said virtual perpendicular plane for each of the groups.

6. An object observing method according to claim 4, in which said sixth step of comparing is a step of setting a predetermined region including the respective projection points formed on said virtual perpendicular plane by the projecting processing of said fifth step, and of weighting the respective points based on the positional relationship of the respective points in said set region with said projection points to be compared with said two-dimensional model data.

7. An object observing device for observing an object comprising two or more cameras directed toward a predetermined observation position, characteristic extracting means for extracting a characteristic portion in each of the respective pictures simultaneously taken by said cameras, corresponding means for corresponding the extracted characteristic portions of the respective pictures extracted by said characteristic extracting means to the pictures, coordinate extracting means for three-dimensionally measuring the characteristic portions corresponded by said corresponding means to extract the three-dimensional coordinates of the characteristic portions, storage means for storing two-dimensional model data of said object, projecting means for setting a virtual perpendicular plane vertically positioning on a plane contacted by said object to project the three-dimensional coordinates of the characteristic portions extracted by said coordinate extracting means on said virtual perpendicular plane, and comparing means for comparing the results of projection by said protecting means with said two-dimensional model data stored in said storage means.

8. An object observing device according to claim 7, in which said projecting means divides said three-dimensional coordinates of the respective characteristic portions extracted by said coordinate extracting means into groups based on a positional relationship on a plane contacted by said object, and projects the three-dimensional coordinates included in the groups on said virtual perpendicular plane for each of the groups.

9. An object observing device according to claim 7 or 8, in which said comparing means sets a predetermined region including the respective projection points formed on said virtual perpendicular plane by the projecting processing of said projecting means, and weights the respective points based on the positional relationship of the respective points in said set region with said projection points to be compared with said two-dimensional model data.

10. An object observing device for observing an object comprising two or more cameras directed toward a predetermined observation position characteristic extracting means for extracting a characteristic portion in each of the respective pictures simultaneously taken by said cameras, representative point specifying means for specifying points respectively showing representative characteristics about the characteristic portions of the respective pictures extracted by said characteristic extracting means, corresponding means for corresponding the respective representative points specified by said representative point specifying means to the pictures, coordinate extracting means for three-dimensionally measuring for each of the representative points corresponded by said corresponding means to extract the three-dimensional coordinates of the respective representative points, storage means for storing two-dimensional model data of said object, projecting means for setting a virtual perpendicular plane vertically positioning on a plane contacted by said object to project the three-dimensional coordinates of the representative points extracted by said coordinate extracting means on said virtual perpendicular plane, and comparing means for comparing the results of projection by said projecting means with said two-dimensional model data stored in said storage means.

11. An object observing device according to claim 10, in which said projecting means divides said three-dimensional coordinates of the respective representative points extracted by said coordinate extracting means into groups based on a positional relationship on a plane contacted by said object, and projects the three-dimensional coordinates included in the groups on said virtual perpendicular plane for each of the groups.

12. An object observing device according to claim 10 or 11, in which said comparing means sets a predetermined region including the respective projection points formed on said virtual perpendicular plane by the projecting processing of said projecting means, and weights the respective points based on the positional relationship of the respective points in said set region with said projection points to be compared with said two-dimensional model data.

13. A traffic flow measuring device for observing a flow of a vehicle on a road to measure traffic flow data on the road based on time change of the observation results comprising two or more cameras disposed above the road directed toward an observation position on the road, characteristic extracting means for extracting a characteristic portion in each of the respective pictures simultaneously taken by said cameras for each predetermined time period, corresponding means for corresponding the extracted characteristic portions of the respective pictures extracted by said characteristic extracting means to the pictures, coordinate extracting means for three-dimensionally measuring the characteristic portions corresponded by said corresponding means to extract the three-dimensional coordinates of the characteristic portions, projecting means for setting a virtual perpendicular plane along the road to project the three-dimensional coordinates of the characteristic portions extracted by said coordinate extracting means on said virtual perpendicular plane, storage means for storing a shape model of a side face of each vehicle about a plurality types of vehicles, vehicle discriminating means for comparing the projection results by said projecting means with the respective models stored in said storage means to discriminate vehicles on the road, and observing means for sequentially tracing the discrimination results by said vehicle discriminating means to observe the flow of the vehicles on the road.

14. A traffic flow measuring device for observing a flow of a vehicle on a road to measure traffic flow data on the road based on time change of the observation results comprising two or more cameras disposed above the road directed toward an observation position on the road, characteristic extracting means for extracting a characteristic portion in each of the respective pictures simultaneously taken by said cameras for a predetermined time period, corresponding means for corresponding the extracted characteristic portions of the respective pictures extracted by said characteristic extracting means to the pictures, coordinate extracting means for three-dimensionally measuring the characteristic portions corresponded by said corresponding means to extract the three-dimensional coordinates of the characteristic portions, projecting means for setting a virtual perpendicular plane along the road to project the three-dimensional coordinates of the characteristic portions extracted by said coordinate extracting means on said virtual perpendicular plane, vehicle discriminating means for discriminating vehicles on the road by employing a relative positional relationship of three dimensional coordinates satisfying a predetermined height condition among the three dimensional coordinates of the respective characteristic portions extracted by said coordinate extracting means, and observing means for sequentially tracing the discrimination results by said vehicle discriminating means to observe the flow of the vehicles on the road.

15. A parking lot observing device for observing vehicles parking within a predetermined shape of area comprising two or more cameras disposed above said area directed toward said area, characteristic extracting means for extracting a characteristic portion in each of the respective pictures simultaneously taken by said cameras for a predetermined time period, corresponding means for corresponding the extracted characteristic portions of the respective pictures extracted by said characteristic extracting means to the pictures, coordinate extracting means for three-dimensionally measuring the characteristic portions corresponded by said corresponding means to extract the three-dimensional coordinates of the characteristic portions, projecting means for setting a virtual perpendicular plane vertically standing on a vehicle parking plane of said area to project the throe-dimensional coordinates of the characteristic portions extracted by said coordinate extracting means on said virtual perpendicular plane, storage means for storing a shape model of a side face of each vehicle about a plurality types of vehicles, and vehicle discriminating means for comparing the projection results by said projecting means with the respective models stored in said storage means to discriminate vehicles on the area.

* * * * *